United States Patent
Yasuna et al.

(10) Patent No.: US 11,587,586 B1
(45) Date of Patent: Feb. 21, 2023

(54) DETERMINING LASER INDUCED THERMAL PROTRUSION AND LASER THRESHOLD IN HEAT-ASSISTED MAGNETIC RECORDING (HAMR) DATA STORAGE

(71) Applicant: Western Digital Technologies, Inc., San Jose, CA (US)

(72) Inventors: Kei Yasuna, Fujisawa (JP); Guoxiao Guo, Irvine, CA (US); Masaru Furukawa, Fujisawa (JP); Shaomin Xiong, Fremont, CA (US); Duc H. Banh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/672,050

(22) Filed: Feb. 15, 2022

(51) Int. Cl.
*G11B 7/12* (2012.01)
*G11B 13/04* (2006.01)
*G11B 5/00* (2006.01)

(52) U.S. Cl.
CPC ...... *G11B 13/04* (2013.01); *G11B 2005/0021* (2013.01)

(58) Field of Classification Search
CPC ... G11B 7/1263; G11B 5/455; G11B 7/00456; G11B 7/1267; G11B 7/00458; G11B 13/08; G11B 2005/0021; G11B 11/1051; G11B 11/105; G11B 5/00; G11B 5/6088; G11B 11/10511; G11B 11/80; G11B 11/10534; G11B 5/012; G11B 5/02; G11B 5/54; G11B 5/40; G11B 5/4555

USPC ..................................................... 360/75, 60
See application file for complete search history.

(56) References Cited

U.S. PATENT DOCUMENTS

| | | | |
|---|---|---|---|
| 8,068,306 B2 * | 11/2011 | Ramamoorthy | G11B 5/6064 360/60 |
| 8,787,125 B1 | 7/2014 | Lee | |
| 8,897,104 B1 | 11/2014 | Yan et al. | |
| 9,153,266 B1 | 10/2015 | Chia et al. | |
| 9,685,182 B1 | 6/2017 | Granz et al. | |
| 9,704,529 B1 | 7/2017 | Lou et al. | |
| 9,786,310 B1 | 10/2017 | Richter et al. | |

(Continued)

OTHER PUBLICATIONS

Kun, Ma "Servo Pattern Enhancements for High Areal Density Hard Disk Drives", Nanyang Technological University, pp. 178, 2017.

(Continued)

*Primary Examiner* — Nabil Z Hindi
(74) *Attorney, Agent, or Firm* — Neugeboren O'Dowd PC

(57) ABSTRACT

Various illustrative aspects are directed to a data storage device, comprising: one or more disks; an actuator assembly comprising a head, and configured to position the head over a corresponding disk surfaces; and one or more processing devices, wherein the head comprises: a write element; a laser unit; and a fly height control element, and wherein the one or more processing devices are configured to: iteratively perform write start operations of write start patterns with the head on the corresponding disk surface, at a plurality of values of at least one of laser pre-bias current, and write backoff; detect pattern signal amplitudes of the write start patterns on the corresponding disk surface; and determine a relation of write backoff to laser pre-bias current for the head, based at least in part on the pattern signal amplitudes.

20 Claims, 7 Drawing Sheets

(56) References Cited

U.S. PATENT DOCUMENTS 9,881,641 B1 1/2018 Canchi et al.
10,515,658 B1 12/2019 Mader

OTHER PUBLICATIONS

Li et al., "A New AFM-Based Technique to Detect the NFT Protrusion on HAMR Head", IEEE Transactions on Magnetics, vol. 49, No. 7, pp. 3576-3579, Jul. 2013.
Wu, Haoyu "A Study of the Head Disk Interface in Heat Assisted Magnetic Recording-Energy and Mass Transfer in Nanoscale", Doctor of Philosophy in Engineering-Mechanical Engineering, pp. 1-98, 2018.
Xiong et al., "Setting Write Spacing in Heat Assisted Magnetic Recording", IEEE Transactions on Magnetics, vol. 54, No. 8, pp. 7, Aug. 2018.
Zhang et al., "Characterization of Laser-Induced Protrusion in HAMR by the Burnish Method", IEEE Transactions on Magnetics, pp. 1-6, Jan. 2015.

\* cited by examiner

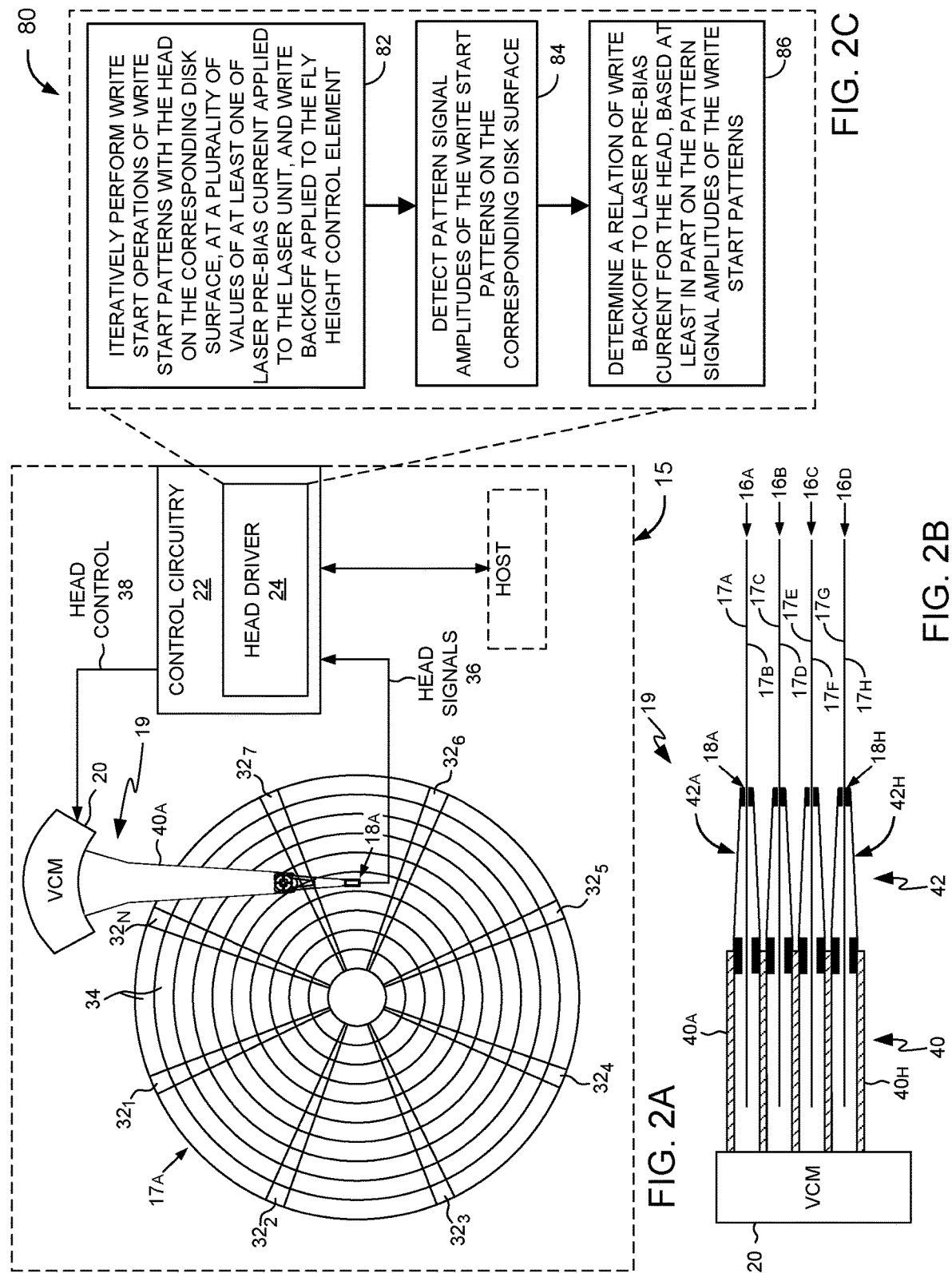

DETERMINING LASER INDUCED THERMAL PROTRUSION AND LASER THRESHOLD IN HEAT-ASSISTED MAGNETIC RECORDING (HAMR) DATA STORAGE

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

Various examples disclosed herein provide data storage devices, such as hard disk drives with heat-assisted magnetic recording, that are configured to characterize thermal deformation and laser current threshold of a disk drive read/write head during transient pre-lasing, and thereby enable new capabilities in extremely accurate, fast, and reliable self-servo write processes, among other aspects.

New, blank disk drives must undergo a servo write process, such as a self-servo write process, before being usable for data storage. A spiral based self-servo write process of this disclosure may comprise performing extremely short write operations, shorter than are performed in the typical prior art, to enable more precise self-servo operations. In some circumstances, a long write pattern may inadvertently erase a portion of the spiral pattern, which may degrade the spiral based self-servo write. To overcome this issue, a shorter servo pattern may be written. In some cases, more of the disk surface may be available for user data since less of the disk surface is occupied by a shorter servo pattern. In these short write operations, a laser unit in the head may be pre-biased, or be made to undergo pre-lasing, to prepare to emit a laser to implement heat-assisted magnetic write operations. The pre-biasing of the laser may cause partial thermal protrusion of the head write element, which is less than the normal full thermal protrusion during normal write operations. Performing the short write operations accurately and safely requires accurately determining the partial thermal protrusion of the head write element during short write operations. However, determining the thermal protrusion of the write element of heads has typically relied on techniques that require long write operations, such as comparing short burst write scheme (BWS) write operations with normal, long write operations.

Disk drives and control circuitry of this disclosure may overcome these and other limitations of the prior art and enable novel advantages by implementing processes to accurately determine the partial thermal protrusion of the head write elements during very short write operations, and without requiring comparison with normal, long write operations, thereby enabling accurate calibration and control of fly height of the heads during very short write operations. Control circuitry of this disclosure may thus enable precise and safe implementation of very short write operations, including for faster and more precise self-servo writing of a disk drive. Control circuitry of this disclosure may accurately determine the partial thermal protrusion of the head write elements during very short write operations, even for each head individually, including by performing very short write start operations at various values of both laser pre-bias current and write backoff, and processing the results to determine an accurate relation of write backoff spacing delta relative to laser pre-bias current during short write operations. Control circuitry of this disclosure may then precisely calibrate control of the heads using this accurate relation of write backoff spacing delta relative to laser pre-bias current during short write operations, even on a per-head basis, to account for variability between heads, thereby enabling more precise self-servo write processes. Additionally, or alternatively, aspects of the present disclosure may also facilitate in determining one or more model parameters pertaining to the hard disk drive. These model parameters may be used to model other aspects of the hard disk drive in addition to (or in lieu of) the laser pre-bias current. In some examples, these model parameters may be used to model write operations of various durations, including both long and short write operations.

Control circuitry of this disclosure may also accurately determine the laser threshold for the laser unit of each head, determine relations for and calibrate short write operations of bootstrap spiral patterns, and implement further novel and advantageous processes of this disclosure, in various examples. These and a variety of further advantages are elucidated in the detailed description below and the accompanying figures.

Various illustrative aspects are directed to a data storage device, comprising one or more disks, an actuator assembly comprising a head, and configured to position the head over a corresponding disk surface of the one or more disks, and one or more processing devices. The head comprises a write element, a laser unit, and a fly height control element, and wherein the one or more processing devices are configured to iteratively perform write start operations of write start patterns with the head on the corresponding disk surface, at a plurality of values of at least one of laser pre-bias current applied to the laser unit and write backoff applied to the fly height control element. The processing device may also detect pattern signal amplitudes of the write start patterns on the corresponding disk surface and determine a relation of write backoff to laser pre-bias current for the head, based at least in part on the pattern signal amplitudes of the write start patterns.

Various illustrative aspects are also directed to a method comprising iteratively performing, by one or more processing devices, write start operations of write start patterns with a head of a data storage device on a corresponding disk surface of the data storage device, at a plurality of values of at least one of laser pre-bias current applied to a laser unit of the head, and write backoff applied to a fly height control element of the head. The method may further comprise detecting, by the one or more processing devices, pattern signal amplitudes of the write start patterns on the corresponding disk surface and determining, by the one or more processing devices, a relation of write backoff to laser pre-bias current for the head, based at least in part on the pattern signal amplitudes of the write start patterns.

Various illustrative aspects are also directed to one or more processing devices, comprising means for iteratively performing write start operations of write start patterns with a head of a data storage device on a corresponding disk surface of the data storage device, at a plurality of values of at least one of laser pre-bias current applied to a laser unit of the head, and write backoff applied to a fly height control element of the head, means for detecting pattern signal amplitudes of the write start patterns on the corresponding disk surface, and means for determining a relation of write backoff to laser pre-bias current for the head, based at least in part on the pattern signal amplitudes of the write start patterns.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, in accordance with aspects of the present disclosure.

FIG. 2C illustrates a method that a data storage device may perform, execute, and implement, in accordance with aspects of the present disclosure.

DETAILED DESCRIPTION

Figure 1:
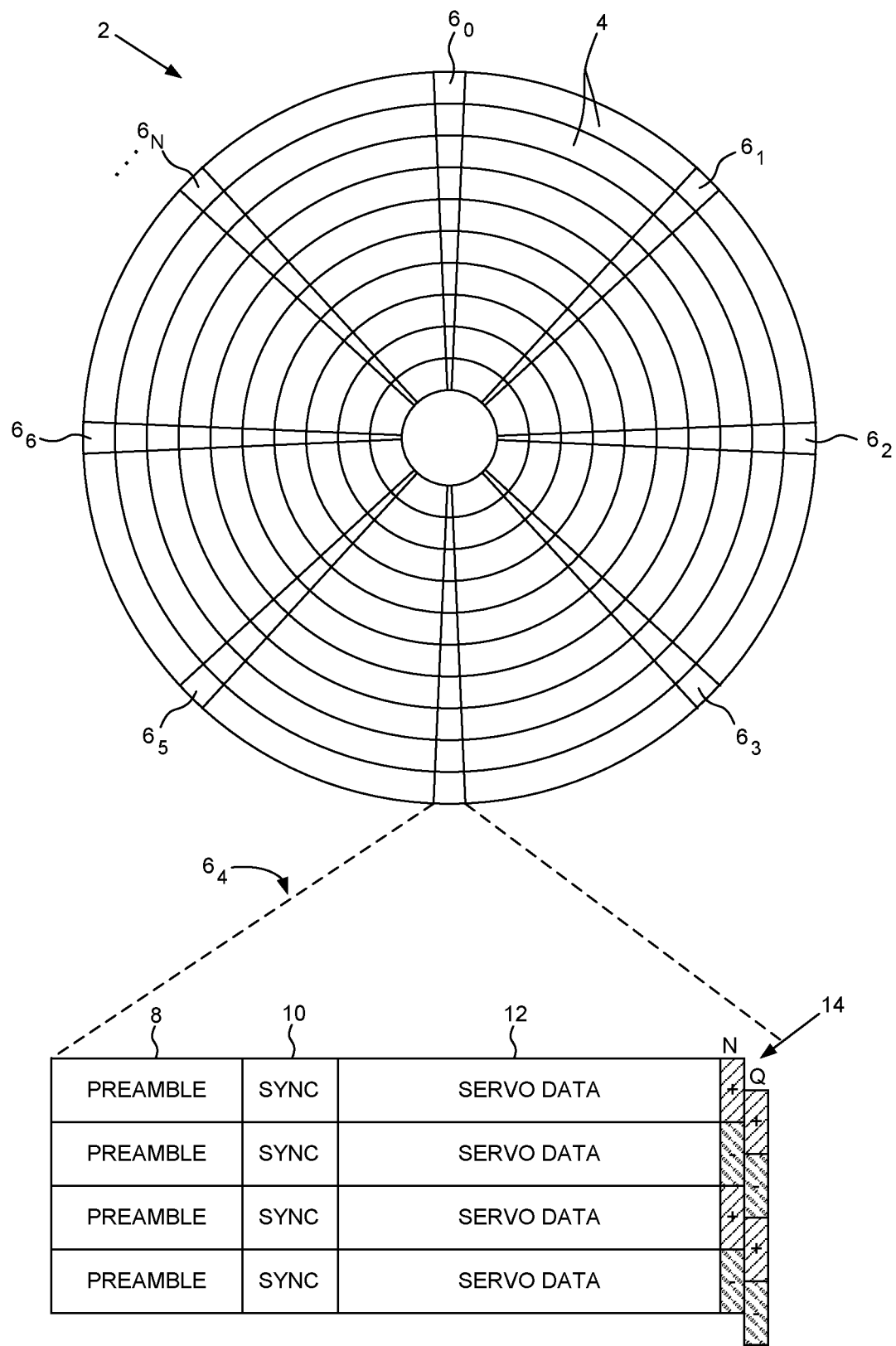
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may be heat-assisted magnetic recording (HAMR) heads, each comprising write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of read/write heads 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

As a spindle motor (not shown) rotates the one or more disks 16, disk drive 15 carefully controls the fly height of heads 18 over the corresponding disk surfaces 17, to maximize data areal density while maintaining safe fly height to avoid any non-negligible risk of potentially catastrophic physical head-disk contact. A suspension 42 (e.g., topmost suspension 42A, lowest suspension 42H) may exert a small spring force on the slider and head downward toward the disk surface, while a slider (at the position of heads 18, and also too small to be depicted on the scale of FIG. 2B) may comprise an aerodynamic air bearing surface (ABS) that exerts a counteracting air bearing force upward from the corresponding disk surface 17. The air bearing force may have a substantially proportional relation with proximity to the disk surface 17, such that the opposing air bearing and suspension forces are balanced in an inherent equilibrium at a desired primary default fly height above the disk surface, and any deviation from the specified fly height in either direction is biased by mechanical feedback back to the nominal fly height. Disk drive 15 may be configured with a custom interior atmosphere purged of normal air and filled with helium instead, to provide an aerodynamically and thermodynamically simpler and more laminar aerodynamic medium, in various examples.

The effective fly height of the head over the disk surface, that is, the fly height of the write and read elements of the head during write and read operations, may be strongly affected by thermal deformation, including thermal protrusion, of the write and/or read elements and of the body of the head during write and/or read operations. Such fine-scale variability in fly height, such as due to the thermal protrusion of the write and/or read elements, may be compensated for or addressed by one or more thermal fly height control (TFC) elements on the head, which may implement fine-scale control of the fly height. For example, head 18A may comprise a write element, a laser unit, and a fly height control element such as one or more TFC elements (all further described below), and disk drive 15 may be configured to perform write backoff (WBO) operations with one or more of the TFC elements of head 18A during write operations with the write element comprised in and disposed on the head, to compensate for thermal protrusion or other deformations of the write element during the write operations. In various examples, disk drive 15 may be configured to determine or characterize and to compensate for thermal protrusion, and/or any other type of deformation, of head 18A and of any one or more components, elements, or aspects thereof, in various examples.

Control circuitry 22 may comprise one or more processing devices that may implement a self-servo write process, in which the disk drive writes bootstrap spiral servo patterns on blank disk surfaces, and then uses those bootstrap spiral servo patterns to self-write the final spiral servo patterns. Control circuitry 22 may use motor back electromagnetic force (BEMF) in writing the initial spirals. Control circuitry 22 may also use spindle locked clock disk phase in writing the initial spirals in various aspects of this disclosure, as described below. Control circuitry 22 may perform iterative writing of spirals based on prior spirals, such as two, three, four, or any number of iterations of writing spirals from initial bootstrap spirals to final spirals, in different examples, before using the final spirals to write concentric tracks, which may be used as a map for subsequent operations.

The self-servo write process in accordance with examples of this disclosure may comprise performing extremely short write operations, shorter than are performed in the typical prior art. Performing the write operations accurately and safely requires accurately determining the thermal protrusion of the write element of heads 18. However, determining the thermal protrusion of the write element of heads 18 has typically relied on techniques that require long write operations, such as comparing short burst write scheme (BWS) write operations with normal, long write operations. Control circuitry 22, including head driver 24, of examples of this disclosure may overcome these and other limitations of the prior art and enable novel advantages by implementing various example processes to accurately determine the partial thermal protrusion of the write element of heads 18, and even of each head 18 individually, in various examples, including by performing very short write starts at various values for both laser pre-bias current (described below) and write backoff, and processing the results to determine an accurate relation of write backoff spacing delta relative to laser pre-bias current, among other processes of this disclosure, in various examples.

The thermal protrusion of the write element during write operations may be due in part to thermal expansion induced by the thermal energy of the write current, such as through a near-field transducer (NFT) of the write element, as well as due to in part to thermal expansion induced by operations of a laser unit comprised in the head and configured to emit a laser guided through a waveguide on the NFT for purposes of heat-assisted magnetic recording. In some cases, the waveguide may be used to couple (or shine) the energy emanating from the laser on the NFT, upon which the NFT resonates via surface plasmon and couples the energy to the disk. This serves to create a small heat spot on the disk surface, where the heat spot is smaller than the wavelength of the laser. It should be noted that, the laser may not directly shine on the disk surface. In some cases, the disk surface may be configured with significant magnetic coercivity to help enable the stability of magnetic bits at high areal density. During a write operation, the laser adds thermal energy to a small area of the disk surface at a time, thereby elevating the media temperature to reduce the energy required to reorient the magnetization in alignment with a magnetic field of the write element. The new orientation of the magnetic domains in that small area may then be induced by the head to magnetically encode a bit, as written by the write element; and as the thermal energy quickly dissipates from the area again, the new magnetic alignment of that small area encoding that bit becomes stably entrenched, ensuring stability of the data or control pattern thus written.

Maintaining precise control of fly height is important to ensure that the heads are very close to the disk surface, to enable strong write and read signals for very small bit areas, but without coming close enough to the disk surface to risk head-disk contact, which can cause catastrophic damage, and sometimes even the complete loss of operability of disk drive 15. Determining the thermal protrusion of the write head during write operations, which dynamically changes the fly height, which is measured from the write head to the disk surface, relative to the fly height of the slider, is thus important to maintain control of the fly height. The fly height control functions of the disk drive must be calibrated, in what may be referred to as clearance calibration or fly height calibration, based on this determined thermal protrusion, to implement proper fly height, in order to achieve both the specified areal data density and reliability against crashes of the disk drive.

In a typical prior art system, thermal protrusion of the write head during write operations may be determined from a fixed proportionality relationship with the laser current, i.e., the current delivered to the laser to operate the laser during write operations, in burst write scheme (BWS) write operations. The basis for this relationship is that the higher the laser current, the greater the thermal protrusion of the write head, with a substantially proportional relationship.

However, the effort to further increase performance characteristics of disk drives such as areal density has led, in examples of the present disclosure, to relying on performing novel self-servo write schemes that use extremely short write operations, such as concentric fill write operations with durations that may need to be for only less than 0.3 microseconds (e.g., in the outer diameter or OD zone), less than 0.6 microseconds (e.g., in the inner diameter or ID zone), less than 1.5 microseconds, in some illustrative examples. In some circumstances, short write operations may also alleviate some of the issues associated with the manufacturing process. For instance, in some cases, servo pattern writing referencing (i.e., used as a reference for the servo patterns written on the disk surface) on the spirals may be adversely impacted when long write operations are utilized, since longer writes may erase the spirals. Additionally, shorter concentric servo patterns may enable the servo format overhead to be low, thus leaving the majority of the disk surface available for user data. Burst write scheme operations require measuring and comparing thermal protrusion of the write head during both burst write operations and normal write operations.

Various novel self-servo write schemes of the present disclosure perform write operations with very short durations, and with laser activation times of even shorter durations, such as less than 300 nanoseconds in some illustrative examples, prior to performing any normal write operations. Because the laser activation times and write operation times are so short for various novel self-servo write schemes of the present disclosure, there is only time for a partial thermal protrusion of the write head. Typical prior art clearance calibration methods are not capable of accurately determining thermal protrusion of the write head and proper calibration of unique fly height needed during the very short novel self-servo write operations. In some examples, aspects of the present disclosure may utilize indirect measurements of the laser power to the NFT spacing change and/or the laser threshold power. Further, during a laser optimization process, the NFT spacing change at any laser power may be estimated, for instance, using the indirect measurements for each head. It is noted while self-servo write is a context for some short write operations, various embodiments of the disclosure are applicable to other short write operations performed in the operation of the disk drive.

Short write operation times and short write laser activation times may take any of various values, constraints, or orders of magnitude in other examples. In various examples, a short write operation may be for or less than several single-digit microseconds, one microsecond or less, several hundred nanoseconds or less, or other values. In various examples, a short write laser activation operation may be for or less than several single-digit microseconds, one microsecond or less, several hundred nanoseconds or less, 100 nanoseconds or less, tens of nanoseconds or less, or other values.

Various systems, devices, and methods of this disclosure may enable accurate fly height calibration of the head for short write operations. For this reason, methods of this disclosure may be referred to as "pseudo-burst write scheme" or "pseudo-BWS," because they may fulfill the advantageous features of a burst write scheme, but at fine scales of time and thermal protrusion beyond the capability envelope of burst write scheme operations. As used herein, the terms "pseudo-burst write scheme", "pseudo-BWS", "pre-biased burst write", or "pre-biased BWS" may be used interchangeably throughout the disclosure. Further, various systems, devices, and methods of this disclosure may enable custom, accurate fly height calibration of each individual head of each disk drive, rather than determining and applying a single, blanket fly height calibration to all heads of a disk drive, a batch of disk drives, or a product line of disk drives, in various examples. As feature sizes continue to decrease, the novel capability of making custom fly height determinations for each individual head may be increasingly valuable and may help compensate for any potential variations or imprecisions in the nanoscale manufacturing of the applicable features, in accordance with principles of this disclosure. Further, various systems, devices, and methods of this disclosure may also enable custom determination of the laser current threshold for each head, which is a novel capability compared to burst write scheme methods, which are not capable of determining laser current thresholds.

In illustrative examples, a system of this disclosure (e.g., disk drive 15) (under the control of its own control circuitry, or potentially including under the operation of a person operating a disk drive in accordance with a method of this disclosure), may iteratively perform a plurality of short write starts, such as burst write starts—that is, at least starting, transient portions of short write operations, such as burst write operations—while applying laser pre-bias current to the laser unit of head 18, i.e., pre-lasing, and while applying write back-off (WBO) operations with the one or more thermal fly height control (TFC) elements of a head, and using a number of different values for the amplitudes applied for either or both of the laser pre-bias and the write back-off. Pre-lasing may be performed for various purposes, such as to minimize the subsequent activation time required for each activation of the laser, and such as to thermally expand, contract, and deform head 18 in more gradual steps, and with less deformation during activations and deactivations of the laser, and/or to have the write element already partially thermally expanded prior to activating the laser for a write operation, to minimize the time, additional deformation, entropy of the write element going to its full thermal expansion upon each activation of the laser, and/or long-term fly height change, any or all of which may thereby help ensure higher precision and lower long-term fly height change (discussed below) than in the case of always activating the laser between zero and full power for each write operation.

Performing short write starts may mimic the applicable behavior of the head during novel, short servo write operations, in which pre-lasing may be applied, and the write operation is too short for the activation of the laser to thermally expand the write element much beyond the partial protrusion induced by the pre-lasing. Disk drive 15 may then perform read operations of the burst write start patterns written on the disk drive surface corresponding to the head and measure the pattern signal amplitude from each of the burst write start patterns and make further use of those pattern signal amplitudes of short write start patterns written under various conditions of write backoff and laser pre-bias current, as further described below.

Control circuitry 22 of disk drive 15 may thus perform short write start operations of short write start patterns. Such short write start operations may be of a short enough duration that a thermal protrusion of the head is only a partial protrusion due to the partial thermal energy of pre-lasing, or applying the laser pre-bias current, without being sufficient to cause the laser emitted from the laser unit to heat the media for writing, and does not reach a full level of thermal protrusion that occurs during normal write operations with the head, in various examples, as further described herein (e.g., with reference to FIGS. 3A, 3B, and 3C, described below). The write start operations of the write start patterns may mimic short burst write scheme start operations of burst write scheme start patterns, in various examples.

Control circuitry 22 of disk drive 15 may then determine, for the given head, the relation of the thermal protrusion of the write head of the disk drive per the amplitude of laser pre-bias current applied to the laser unit of the head. This relation, as may be determined by methods, systems, and devices of this disclosure, of the thermal protrusion of the write element of the head of the disk drive per the amplitude of laser pre-bias current applied to the laser unit of the head, may be referred to as a TFC and Pre-bias spacing Parity relation, or a TPP relation, in accordance with principles of this disclosure. Various examples of methods, systems, and devices enabled or configured for determining the relation of thermal protrusion of a head per amplitude of laser pre-bias current in accordance with this disclosure may thus be referred to as TPP methods, systems, and devices. Control circuitry 22 of disk drive 15 may also determine the laser current threshold per head, as a natural accompaniment to determining the TPP relation per head.

Control circuitry 22 may thus perform, execute, and implement illustrative example method 80 as shown in FIG. 2C. Control circuitry 22 may iteratively perform write start operations of write start patterns with a head 18 on a corresponding disk surface 17, at a plurality of values of at least one of laser pre-bias current applied to the laser unit of head 18 and write backoff applied to the fly height control element of head 18 (82). Control circuitry 22 may detect pattern signal amplitudes of the write start patterns on the corresponding disk surface 17 (84). Control circuitry 22 may determine a relation of write backoff to laser pre-bias current for the head 18, based at least in part on the pattern signal amplitudes of the write start patterns on the corresponding disk surface 17 (86).

Control circuitry 22 of disk drive 15 may then use the determined TPP relation to perform fly height calibration at only partial thermal protrusion of the write element, such as during and to enable short and/or novel write operations, such as novel self-servo scheme write operations, in which the write operations may be too short for the write element to reach steady-state or full thermal protrusion. The thermal protrusion of the write head may be measured in terms of the equivalent spacing counteracted by a given value of power applied to the TFC element of the head, in which the fly height spacing regained from the write backoff operation of the TFC element is equivalent to and cancels out the extent of the thermal protrusion and thus the fly height spacing lost due to thermal protrusion. Control circuitry 22 of disk drive 15 may also then use the determined laser current threshold per head to calibrate pre-lasing and laser operations, and transitions between the two, for the head. These and other novel, advantageous processes, methods, systems, and devices are further explained below.

TFC elements may control fly height by means of directing applied power to a heating element to implement thermal expansion of one or more control surfaces on or proximate to head 18, and thereby to exert a precise influence on the fly height. While various examples of TFC elements are described herein, TFC elements may be illustrative examples of more general fly height control elements of this disclosure. A fly height control element of this disclosure may comprise a TFC element or any other kind of component, device, feature, or other thing that is capable of exerting control or influence of the fly height of a head 18, and/or that enables control circuitry 22 to exert control or influence of the fly height of a head 18, in various aspects of this disclosure.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may take the form of one or more processing devices, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Laser pre-bias is typically discussed herein in terms of laser pre-bias current. In various examples, laser pre-bias may specifically be implemented in other terms, or with certain control elements implemented in other terms, such as specifically in terms of power applied, as opposed to in terms of current applied. The pre-bias applied to the laser unit inherently has both power and current, so any alternative manner of either conceptualizing, labeling, or controlling pre-bias applied to the laser unit may equivalently be conceptualized, labeled, or controlled in terms of pre-bias current, such that any manner of laser pre-bias, or any form of power, voltage, and/or energy applied to the laser unit, inherently falls within the scope of laser pre-bias current as discussed herein and as recited in the claims below.

Figure 3A:
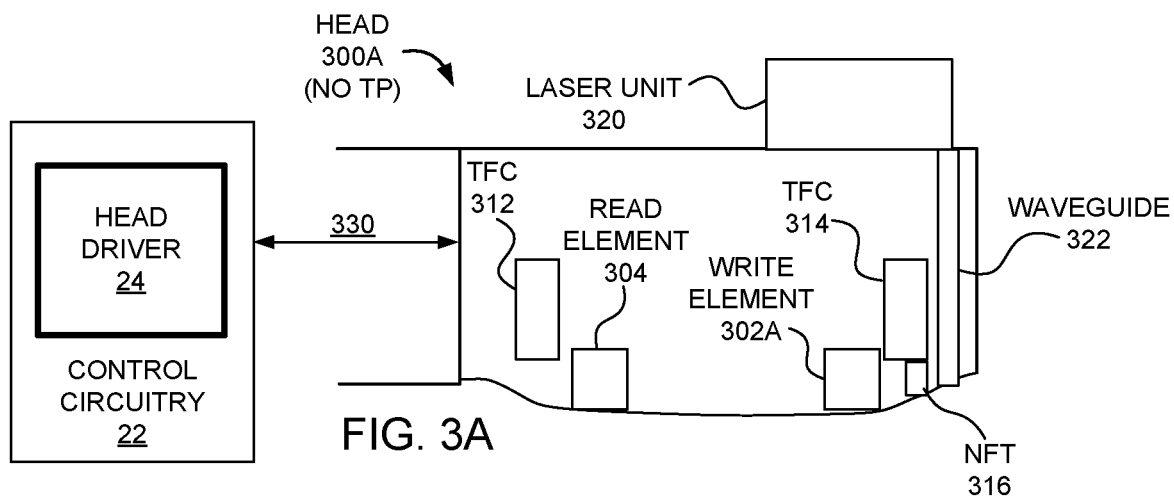
FIGS. 3A-3C show conceptual side view diagrams of a head in various states of thermal protrusion or lack thereof of a write element, in accordance with aspects of the present disclosure.
Figure 3B:
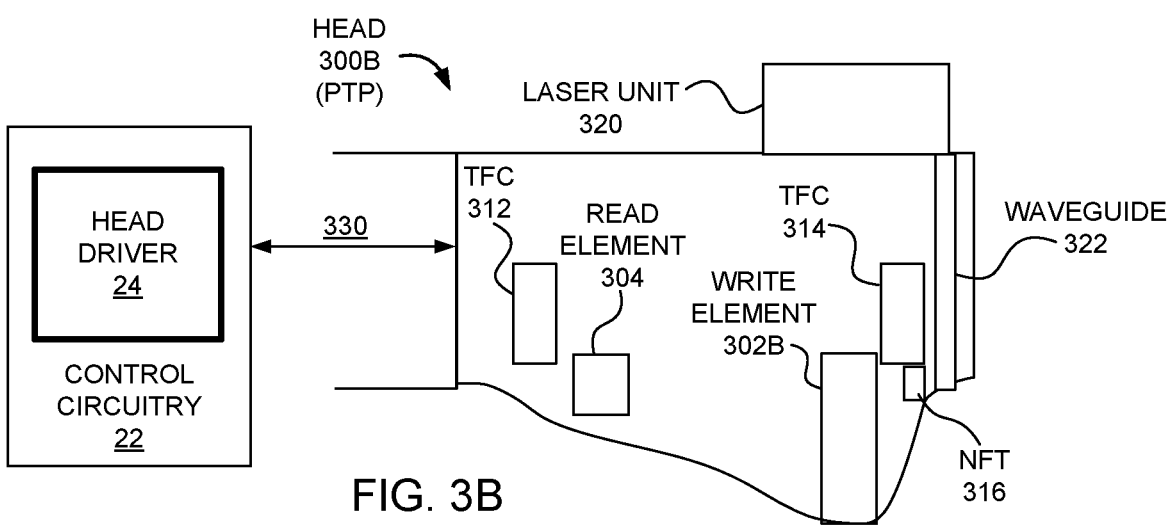
Figure 3C:
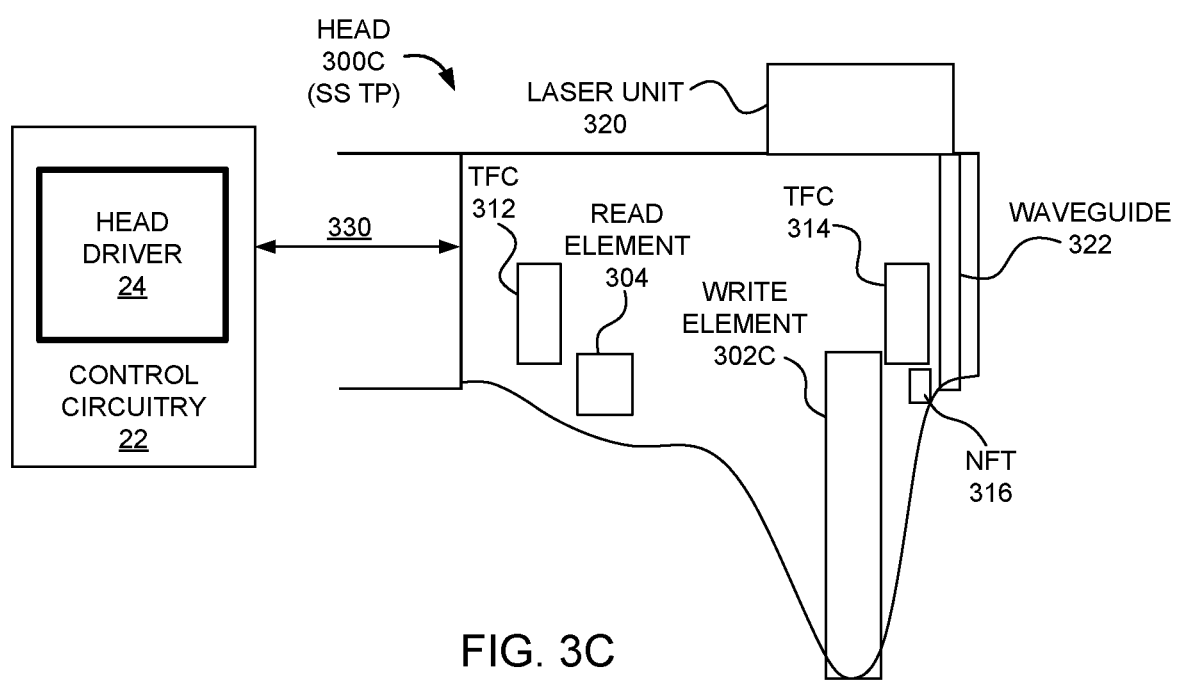

FIGS. 3A-3C show conceptual side view diagrams of a head 300 in various states of thermal protrusion or lack thereof of the write element 302, in accordance with aspects of the present disclosure. FIG. 3A shows a conceptual side view diagram of a head 300A in a resting state with no thermal protrusion of the write element 302A (or "no TP" as shown in the caption for head 300A), in accordance with aspects of the present disclosure. FIG. 3B shows a conceptual side view diagram of a head 300B in a state of partial thermal protrusion of the write element 302B (or "PIP" as shown in the caption for head 300B), such as during a short write operation, such as during a burst write or pre-biased burst write, or such as due to laser pre-bias prior to a write operation, in accordance with aspects of the present disclosure. (The amounts of protrusion may be different in these different cases, but FIG. 3B is not to scale, and conceptually illustrates either case). FIG. 3C shows a conceptual side view diagram of a head 300C in a state of full, steady-state thermal protrusion of the write element 302C (or "SS TP," as shown in the caption for head 300C) during a normal, longer write operation, in accordance with aspects of the present disclosure. Thus, head 300A comprises a write element 302A in a resting state with no thermal protrusion. Head 300B comprises a write element 302B in a state of partial thermal protrusion. Head 300C comprises a write element 302C in a state of full, steady-state thermal protrusion. Heads 300A, 300B, and 300C may be the identical head, and write elements 302A, 302B, and 302C may be the identical write element, but shown in these different thermal deformation states (and thus labeled differently); the single head and single write element may also be referred to as head 300 and write element 302, respectively.

Write element 302 may comprise a write pole and an adjacent or proximate near-field transducer 316 ("NFT 316"). FIGS. 3A-3C are conceptual depictions and not necessarily to scale. The total protrusion displacements depicted may be on the scale of single-digit nanometers, in various examples. The protrusion displacements may also be on other scales in various examples, such as tens of nanometers, or single-digit angstroms. Features of write element 302 and/or surrounding portions of head 300 may be composed of materials suitable for the properties and behavior described herein, such as gold, which is easily deformable, in some examples. The protrusion displacement scales may be close enough to atomic scales that the properties and behavior of write element 302 and proximate surfaces and volumes of head 300 are significantly a matter of condensed matter physics and atomic physics rather than macroscopic mechanical engineering.

Head 300 also comprises a read element 304, first and second thermal fly height control elements (TFCs) 312, 314, laser unit 320, waveguide 322, and communication channel 330. Read element 304 may also undergo thermal protrusion during write, read, or other operations (not shown). Write element 302, read element 304, first and second thermal fly height control elements 312, 314, and laser unit 320 may be communicatively connected (over communication channel 330) with control circuitry 22, including with head driver 24 comprised in control circuitry 22, and may be configured for operative communication of control signals and/or data with control circuitry 22 and with head driver 24 in particular, in various examples. Control circuitry 22 of disk drive 15 may be configured to activate, output, apply, and deliver a laser pre-bias current to laser unit 320, thereby inducing a steady-state partial thermal protrusion of head 300, as shown in FIG. 3B, prior to iteratively performing the write start operations as described herein.

Figure 4:
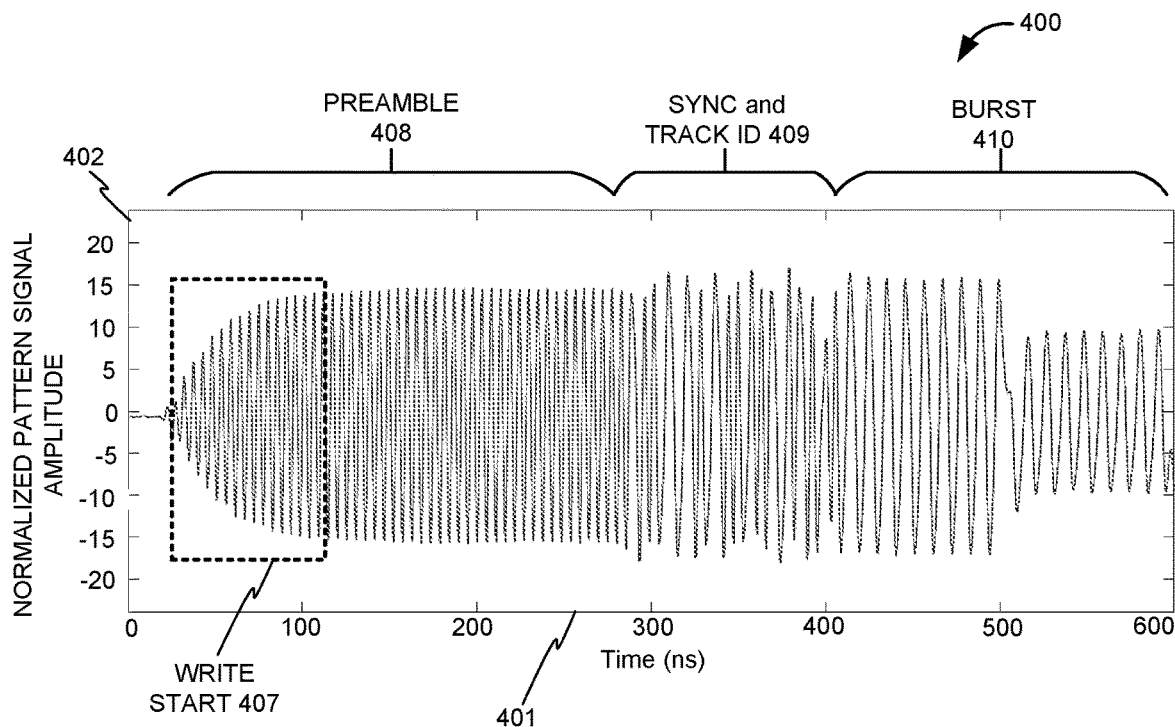
FIG. 4 shows an illustrative example read signal graph of normalized pattern signal amplitude over time, as read by a head from its corresponding disk surface, from the early stages of reading a servo track, in accordance with aspects of the present disclosure.

FIG. 4 shows an illustrative example read signal graph 400 of normalized pattern signal amplitude (in custom units) on y axis 402 over time (in nanoseconds) on x axis 401, as read by a head 18 from its corresponding disk surface 17, from the early stages of reading a servo track, in accordance with aspects of the present disclosure. When the servo tracks are first written, as the write element is first activated and powers up the write signal from zero to the full write signal strength, the write signal undergoes a very brief but non-infinitesimal transitional, transient write start. This transient write start period in writing leaves a very small and brief write start pattern at a very initial portion of each servo preamble 408. Such write start patterns may be negligible on the scale of normal write and read operations and may be ignored in signal processing of the servo tracks in normal operations.

Control circuitry 22 performing a servo track write operation goes on to control head 18/head 300 (hereafter "head 300") to write a sync pattern and a servo data pattern; read signal graph 400 shows in example read signal of the servo pattern, which consists of preamble 408, sync pattern and track ID 409, and burst pattern 410. As write start pattern 407 shows, the pattern signal amplitude rises from zero to the full signal amplitude of the preamble pattern 408 within a short period of time (e.g., approximately 100 nanoseconds in this illustrative example, Pattern signal graph 400 is intended to convey the relevant concepts rather than particular values of pattern signal amplitude over time, so the particular custom units of pattern signal amplitude are not needed for the present conceptual purposes to convey the principles of the present disclosure. Pattern signal amplitude may be measured equivalently in either current or power.) The rate of increase over time of the write start pattern 407 may be dominated by non-linear effects around the beginning and ending stages of write start pattern 407, in this example. These characteristics of write start pattern 407 are shown in the subsequent figures and discussed further below.

Figure 5:
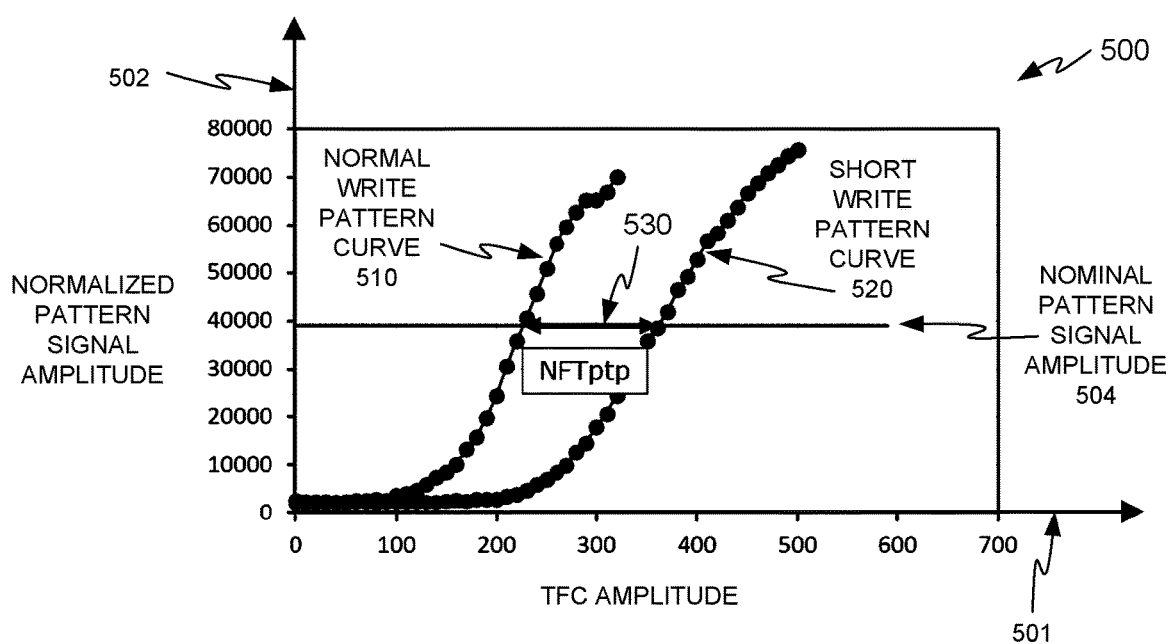
FIG. 5 shows an illustrative example pattern signal graph of comparative normalized pattern signal amplitude over thermal fly-height control (TFC) amplitude, as written by and subsequently read by a head from its corresponding disk surface (as shown in FIGS. 2B, 3B, 3C), from reading both a normal write pattern and a short write pattern such as a burst write pattern, in accordance with aspects of the present disclosure.

FIG. 5 shows an illustrative example pattern signal amplitude graph 500 of comparative normalized pattern signal amplitude (in custom units) on y axis 502 over or relative to thermal fly height control (TFC) amplitude (in custom units) on x axis 501, as written by and subsequently read by head 300 to and from its corresponding disk surface 17 (as shown in FIGS. 2B, 3B, 3C), from reading both a normal write pattern signal (normal write pattern curve 510) and a short write pattern signal (short write pattern curve 520) such as a burst or pre-biased burst write pattern, in accordance with aspects of the present disclosure. The short write pattern may be from a short write that is not necessarily from a burst write. Various example methods of this disclosure make use of short writes that are separate from burst writes, as explained further below.

Read signal amplitude graph 500 is intended to convey the relevant concepts rather than particular values of pattern signal amplitude per TFC amplitude, so the particular custom units aren't needed for the present conceptual purposes to convey the principles of the present disclosure; the TFC amplitude on the scale of graph 500 may be on the order of tens of milliwatts of power or tens of milliamps of current, in various illustrative examples, or greater or lesser scales, in various examples. Pattern signal amplitude may be measured equivalently in either current or power.

In a given write state, and a given corresponding state of thermal protrusion, the fly height of the head may be accurately modeled (to sufficient approximation, within applicable ranges, for present purposes) as being directly proportional to TFC amplitude, where TFC amplitude decreases the fly height of the head over the disk surface. Thus, y axis 502 may also be considered to show inverse fly height, with the 0 value being set at a resting fly height far enough above the disk surface to disable write and read operations, and the high end of y axis 502 representing a no-fly zone at which the fly height would be too close to the disk surface and would push up against or begin to introduce a non-negligible and unacceptable risk of head-disk contact.

The difference between normal write pattern curve 510 and short write pattern curve 520 is due to differential thermal protrusion of the write element between the two. The normal write pattern curve 510 indicates pattern signal amplitudes in a range of different TFC amplitudes and thus different fly heights during a normal write, when the head 300 is in its steady-state full thermal protrusion, as shown in the form of head 300C in FIG. 3C. The short write pattern curve 520 indicates pattern signal amplitudes in a range of different TFC amplitudes and thus different fly heights during a short write, when the head 300 is in its partial thermal protrusion state, as shown in the form of head 300B in FIG. 3B. So, essentially, pattern signal graph 500 shows that greater power is required to be outputted to the one or more TFCs 312, 314 (as shown in FIGS. 3A-3C) on head 300 to achieve the same fly height (to sufficient approximation), and thus to write patterns of equivalent pattern signal amplitude during short writes, with partial thermal protrusion, as shown in short write pattern curve 520, as the pattern signal strength written during normal writes, with full thermal protrusion, as shown in normal write pattern curve 510.

In other words, the relationship of fly height to TFC amplitude may be modeled as having a conversion constant (roughly speaking, or to a sufficient approximation) between normal writes and short writes, based on the difference in thermal protrusion of the write element. That conversion constant is the TFC amplitude difference 530 between the two different values of TFC amplitude required to be outputted to TFCs 312, 314 (as shown in FIGS. 3A-3C) on head 300 to write a pattern with nominal signal strength during either a normal write or a short write. TFC amplitude difference 530 may be compared at a median or nominal operating pattern signal amplitude 504, which may be a specified target amplitude at which patterns should be written in normal operations of the disk drive, to optimize between pattern signal strength and data areal density. TFC amplitude difference 530 may sometimes also be referred to as a near-field transducer pole tip protrusion ("NFTPTP" or "NPTP") delta, referring to a near-field transducer ("NFT," shown in FIGS. 3A-3C as NFT 316) which may be coupled to or comprised in the write element. NPTP due specifically to laser activation at a pre-bias current may also be referred to as NPTP-pre-bias, or NPTPP. In some examples, the NPTP or NFTPTP described throughout this disclosure may be different from the normal write current induced WPTP (i.e., write current induced pole tip protrusion). Further, the term "write backoff" or "WBO" may refer to the TFC backoff power applied to offset spacing changes induced by one or more other factors, such as, but not limited to, WPTP and/or NPTP. In some cases, the WBO may be in an opposite direction to the WPTP and/or NPTP.

In some non-limiting examples, the same or approximately the same read TFC power/amplitude and/or the same (or similar) read spacing may be utilized during read operations. In this way, the signal amplitude difference (e.g., TFC amplitude difference 530) may be based on the write spacing, where the write spacing may be linked to the NFTPTP (e.g., at steady state in the BWS scheme, from pre-bias in the pre-biased BWS scheme) or the TFC power.

Figure 6:
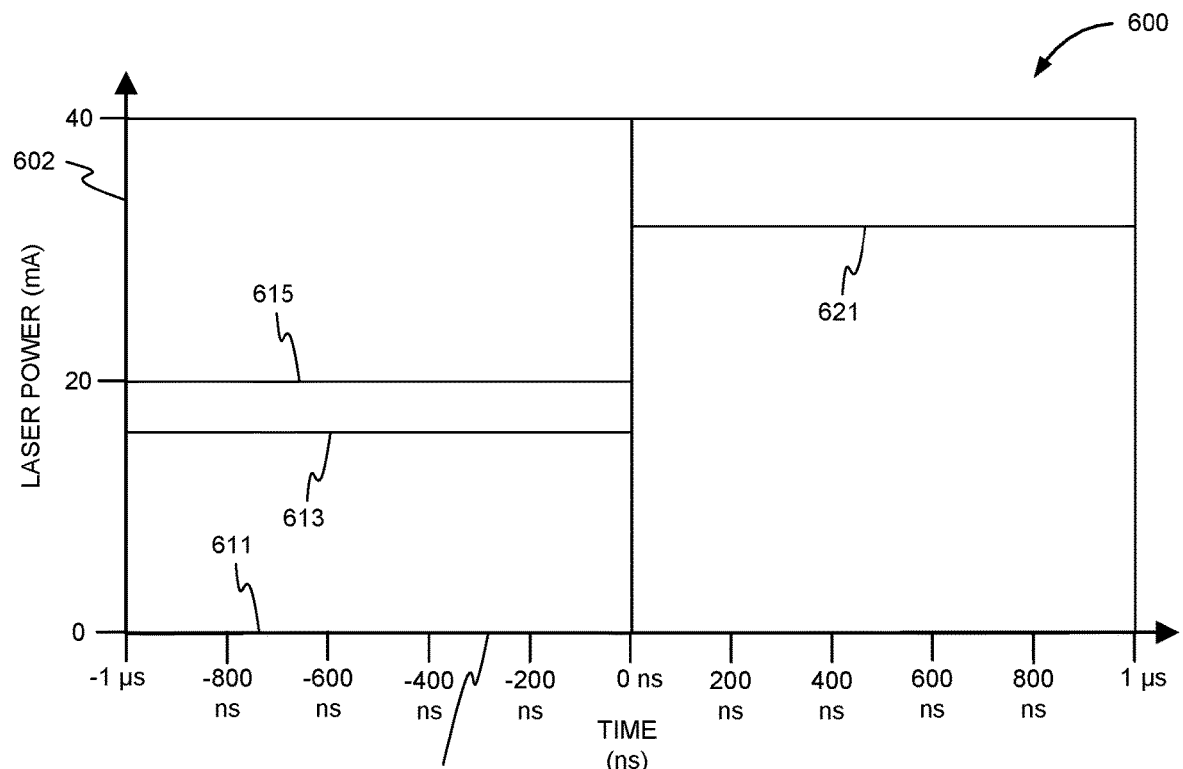
FIG. 6 depicts an illustrative example graph of laser current amplitude over time for a laser unit on a head before and after initiating a write operation by the head, and with various different example values for laser pre-bias current prior to initiating the write operation, in accordance with aspects of the present disclosure.

FIG. 6 depicts an illustrative example graph 600 of laser current amplitude (in milliamps (mA)) on y axis 602 over time (in nanoseconds (ns)) on x axis 601, for laser unit 320 on head 300 before and after initiating a write operation by head 300, and with various different example values 611, 613, 615 for laser pre-bias current prior to initiating the write operation, in accordance with aspects of the present disclosure. Head driver 24 of control circuitry 22 may activate laser unit 320 to its full write current 621 at the time of initiating the write operation, and effectively instantaneously and simultaneously initiate the write operation, on the scale of graph 600, to within a reasonable approximation for purposes of this disclosure. The full laser write current 621 may be set at a standard value for disk drive 15, such as 32 milliamps in this example. The difference in laser current by which the laser current must be increased from the pre-bias current to the full write current is the active bias current; in other words, the pre-bias current plus the active bias current equals the full laser current. A few example pre-bias current values are depicted in FIG. 6, including 0 (611), 16 mA (613), and 20 mA (615). The different values of active bias current to be applied to make up the difference between the pre-bias current and the full current at t=0 are then 32, 16, and 12 mA, respectively. The pre-bias is shown to begin at approximately 1 microsecond in FIGS. 6 and 7 but practically, the pre-bias may be applied earlier to ensure that the NPTP is in steady state.

Figure 7:
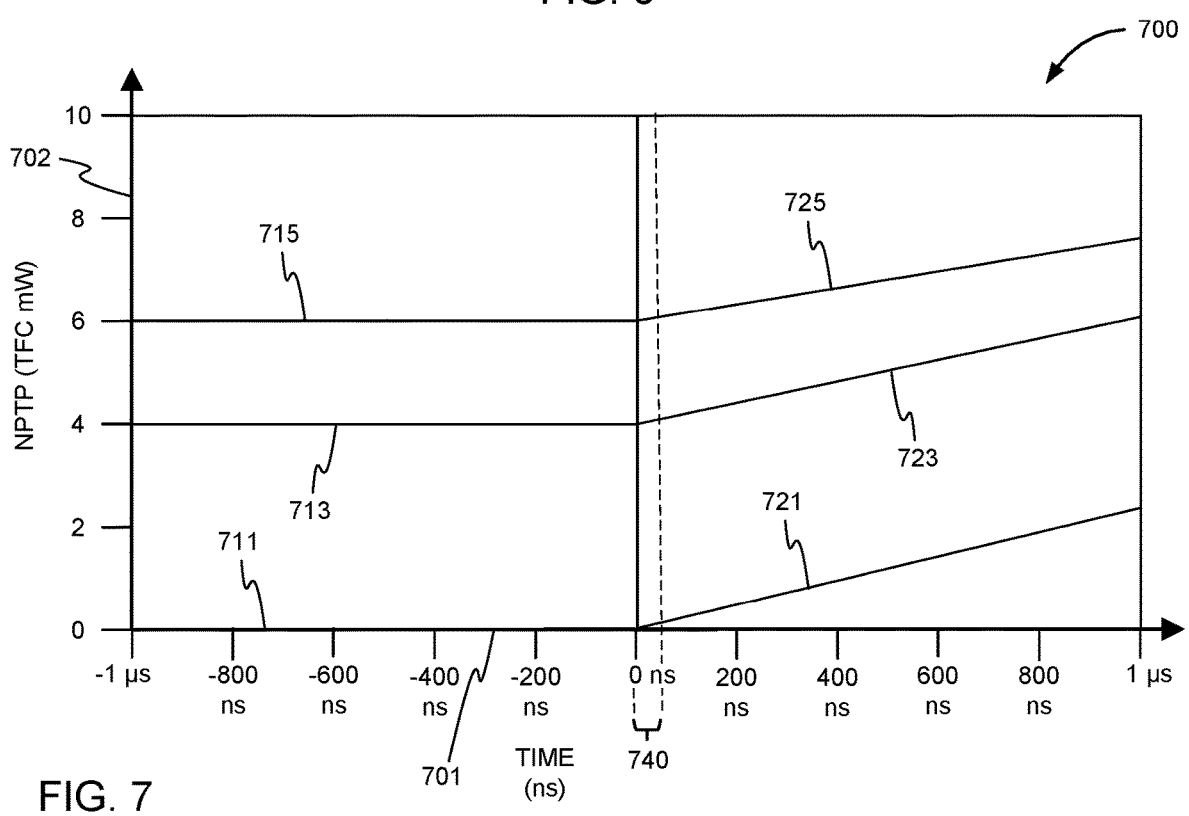
FIG. 7 depicts an illustrative example graph of write backoff (WBO), and equivalently of write element thermal protrusion (or NPTP), over time, for a laser unit on a head before and after initiating a write operation by the head, which may compensate to a greater or lesser degree for thermal protrusion due to laser pre-bias, and with various different example values for pre-bias both before and after initiating the write operation, in accordance with aspects of the present disclosure.

FIG. 7 depicts an illustrative example graph 700 of write backoff (WBO) against time for laser unit 320 on head 300 before and after initiating a write operation by head 300, in accordance with various aspects of the present disclosure. In this example, the WBO (in milliwatts or mW) is shown on y axis 702, while time (in nanoseconds or ns) is shown on x axis 701. As noted above, in some cases, the WBO may be equivalent or proportional to the write element thermal protrusion (NPTP). Further, the laser unit 320 on head 300 may compensate to a greater or lesser degree for thermal protrusion due to laser pre-bias (or alternatively, active laser powers and their durations) before and/or after initiation of a write operation, which is also depicted by way of FIG. 7. In FIG. 7, the thermal protrusion of the write element has been subjected to a laser pre-bias current for sufficient time to be in a steady state of a constant level of protrusion prior to the write start. TFC WBO may also be applied at a constant, steady state compensating value prior to initiating the write start. Partial thermal protrusion of the head write element may thus be expressed in terms of power applied to TFC WBO in milliwatts along y axis 702. FIG. 7 shows example values of 0 mW (711), 4 mW (713), and 6 mW (715).

After the write start begins, the thermal protrusion of the write element starting at each level of laser pre-bias current begins increasing, due to additional thermal expansion due to the additional thermal energy of the laser at its full laser write current. Control circuitry 22 may detect changes or forces tending toward change in fly height due to partial thermal protrusion, and may steadily increase WBO over time to compensate for the increasing thermal protrusion, and proportionally to the thermal protrusion (thus giving the straight diagonal lines 721, 723, 725 for WBO after initiating the write start, for partial thermal protrusion that had started at equivalent WBO of 0 (711), 4 mW (713), and 6 mW (715), respectively, prior to initiating the write start). The full write current of the laser is the same, standard value in each case, in this example; the additional current added to bring the laser from its pre-bias current to the full current is the active bias current. The greater the laser pre-bias current and the greater the initial thermal protrusion, the less thermal protrusion the write element would be subjected to prior to reaching a full extent of its thermal protrusion in steady-state write operations. It should be noted, however, that if the pre-bias current is too high (i.e., exceeds a threshold), there is a risk of erasing the media before the start of write.

However, within the early stages of write starts, for instance, within very early time scales (e.g., within the first 50 nanoseconds, as shown in interval 740 in FIG. 7) after initiating the write start, the rates of increase (as shown by the slopes of the lines depicting thermal protrusion) may be similar to each other, as the time scales are relatively short compared to the time required to achieve steady-state thermal protrusion. On these time scales, the write elements have had only a negligible amount of time to further expand their thermal protrusion due to the active write bias current applied to the laser, beyond the pre-bias current, and the additional thermal expansion is also negligible. Because the values of thermal protrusion increase at a similar, slow rate on the applicable time scales very soon after the initiation of the write start regardless of the levels of laser pre-bias to which the write element was subjected before initiation of the write start, the value of thermal protrusion very soon after the initiation of the write start can be used as an accurate proxy for the value of thermal protrusion prior to the write start.

More importantly, for purposes of this disclosure, the relative differences in protrusion length very soon after the initiation of the write start are even more accurate proxies for the relative differences in the values of thermal protrusion prior to the write start. Various examples of determining TPP according to this disclosure may make use of these relative differences in protrusion length very soon after the initiation of the write start, as accurate proxies for the steady-state differences in thermal protrusion of the write elements due only to the laser pre-bias current, as explained further below. Various examples of determining TPP according to this disclosure may also make use of various combinations of laser pre-bias current and write backoff so that signal amplitudes may be compared for TFC and pre-bias spacing parity (TPP), as explained further below.

Figure 8C:
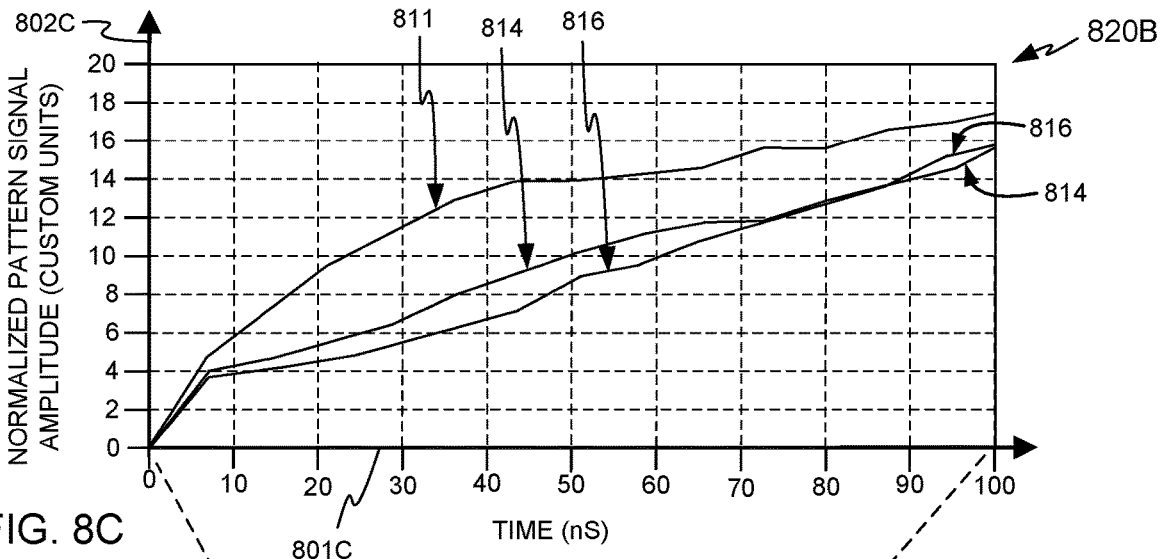
FIGS. 8B and 8C depict graphs showing illustrative slices of data of pattern signal amplitude over time from the matrix of FIG. 8A, in accordance with illustrative aspects of this disclosure.
Figure 8A:
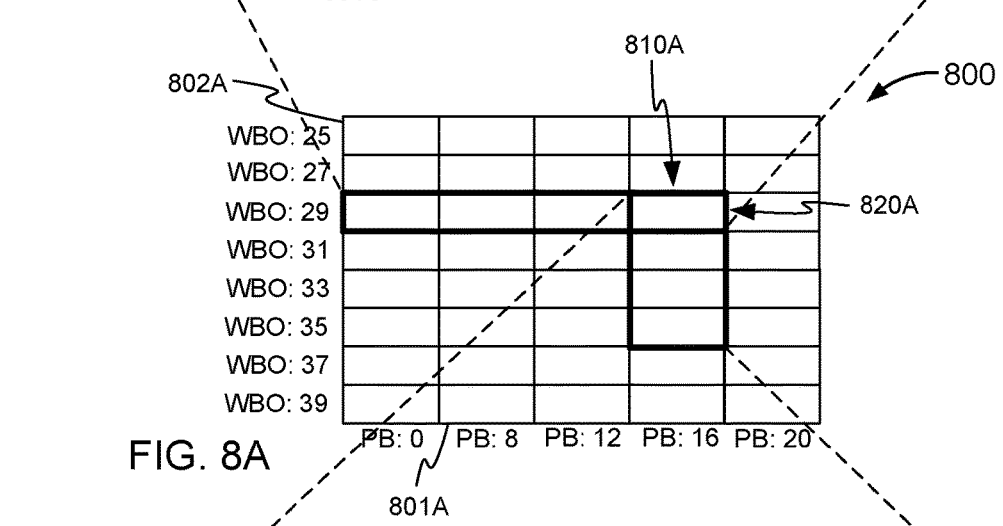
FIG. 8A conceptually depicts a three-dimensional matrix of data that control circuitry may collect from a head during an illustrative example TPP determination method of this disclosure, in accordance with illustrative aspects of this disclosure.
Figure 8B:
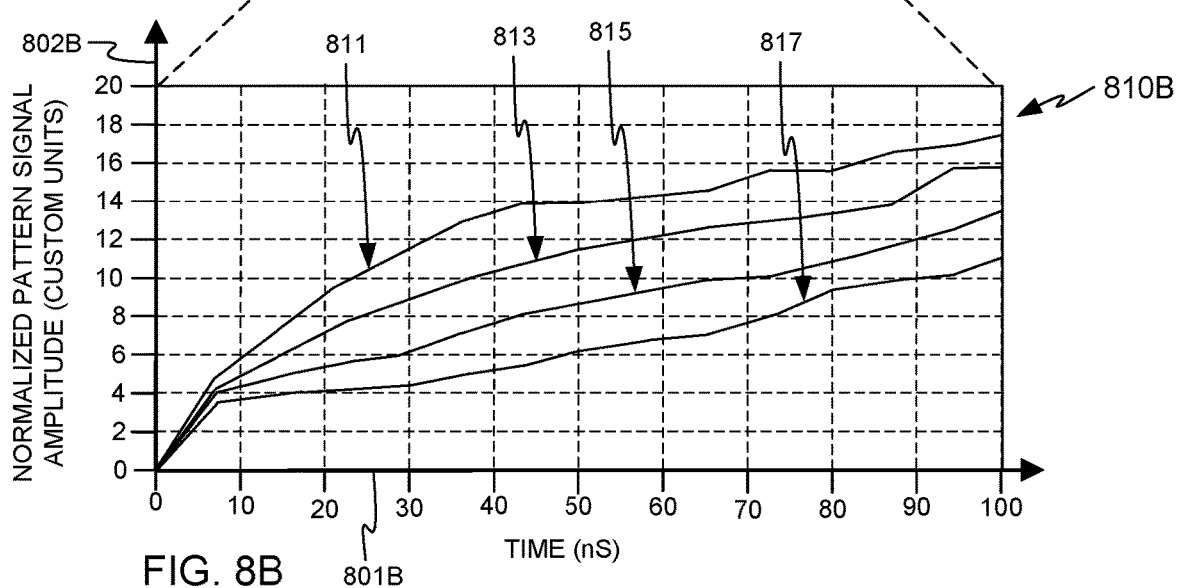

FIG. 8A conceptually depicts a three-dimensional matrix 800 of data that may be collected from head 18 during an illustrative example TPP determination method of this disclosure. This includes data for pattern signal amplitude read by head 18 and collected by control circuitry 22 over a number of short time intervals (e.g., once per 8 nanoseconds; not individually shown in FIG. 8A), at each of a number of values of laser pre-bias amplitude (along the x axis 801, in mA), and at each of a number of values of write backoff (along the y axis 802, in mW). In some cases, TPP may refer to the TFC and pre-bias spacing parity. FIGS. 8B and 8C depict graphs 810B and 820B, respectively, showing illustrative slices of data of pattern signal amplitude over time from matrix 800, including pattern signal amplitude data over time from one illustrative partial column 810A of matrix 800 of various values of write backoff at a single selected laser pre-bias current (16 mA), and pattern signal amplitude data over time from one illustrative partial row 820A of matrix 800 of various values of laser pre-bias current at a single selected write backoff (29 milliwatts), in accordance with illustrative aspects of this disclosure. Graphs 810B and 820B are merely illustrative examples of slices of pattern signal amplitude data over time that may be selected from matrix 800. Graphs 810B and 820B illustratively both include one overlapping time series data set curve, which has the same laser pre-bias that is held constant in graph 810B and the same write backoff that is held constant in graph 820B (i.e., pattern signal amplitude time series curve 811 of pattern signal amplitudes written at a write backoff of 29 milliwatts and a laser pre-bias current of 16 milliamps).

In other words, control circuitry 22 may control head 18 to perform a number of write starts, comprising 40 different write starts in the illustrative example of FIG. 8A, one each at each of five different values of laser pre-bias current and eight different values of write backoff. In particular, in this illustrative example of FIGS. 8A-8C, write starts are performed at laser pre-bias current values of 0, 8, 12, 16, and 20 mA, and at write backoff values of 25, 27, 29, 31, 33, 35, 37, and 39 mW. Other numbers of values, and various other values, of laser pre-bias current and write backoff may be selected.

Later read operations can be performed for the write start patterns from the above write starts, thereby rendering the pattern signal amplitude data collected in matrix 800. These reads may use a variable gain amplifier (VGA) to measure the pattern signal amplitude of each pattern from each read operation. In some examples, for instance, for measuring the amplitude(s) for matrix 800, the VGA may be "frozen" or paused to measure the amplitude with the same gain setting for multiple test patterns. FIGS. 8B and 8C depict the time series data of the depicted example pattern signal amplitude graphs at 8 nanosecond intervals over their first 100 nanoseconds each, rendering 13 data points for each individual pattern signal amplitude time series. This 100 nanosecond interval corresponds with the 100 nanosecond write start interval 407 in the servo track example as shown in FIG. 4; it is the initial rise of the pattern signal from zero toward its full specified pattern signal strength, and within such a short period of time that it is negligible and not relied on for reading in a normal read operation.

Given each individual pattern signal amplitude time series data set, comprising 13 data points, for each of 40 individual combinations of laser pre-bias current and write backoff in example matrix 800, matrix 800 comprises 520 data values across these three dimensions of data. In other examples, control circuitry 22 may also collect data at various other time intervals shorter or longer than the illustrative 8 nanoseconds in this example, and for various periods of time, much shorter or much longer than the illustrative 100 nanoseconds in this example. Control circuitry 22 may control disk drive 15 to read and collect the pattern signal amplitude time series data in any order of reading, and potentially in any order of overlapping reading while still performing further short pattern write operations, in various illustrative example methods including TPP relation determination methods of this disclosure.

FIG. 8B depicts a graph 810B of pattern signal amplitudes on y axis 802B over time on x axis 801B, showing illustrative pattern signal amplitude time series curves 811, 813, 815, and 817 for write backoff values of 29, 31, 33, and 35 mW, respectively, at a constant value of laser pre-bias current of 16 mA, at 8 nanosecond intervals during the first 100 nanoseconds after initiating a short pattern write operation. Each of these time series shows the pattern signal being detected from the very first few nanoseconds after the read head begins to encounter it, and where the write head had just barely begun to exert a physical effect on the medium of the disk surface As illustratively depicted in FIG. 8B, the higher the value of write backoff at the same laser pre-bias current, the lower the pattern signal amplitude—consistent with the head having been controlled by the higher write backoff to be positioned at a higher fly height during the short pattern write operation, and thus leaving a weaker pattern in the disk surface that renders lower pattern signal amplitudes during the read operation. FIG. 8B also shows that the relative rate of increase in pattern signal amplitude varies over time but is not very divergent from being at least relatively linearly proportional during certain intervals, such as the interval of 30 to 50 nanoseconds, for example. This is only a fraction of the already short and typically negligible approximately 100 nanosecond write start time interval, as discussed above, and ends only halfway through it, when the highest examples of pattern signal amplitude are still only a fraction of the specified nominal pattern signal amplitude for normal read operations.

FIG. 8C depicts a graph 820B of pattern signal amplitudes on y axis 802C over time on x axis 801C, showing illustrative pattern signal amplitude time series curves 811, 814, and 816 for laser pre-bias current values of 29, 31, 33, and 35 mW, respectively, at a constant value of laser pre-bias current of 16 mA, at 8 nanosecond intervals during the first 100 nanoseconds after initiating a short pattern write operation. As noted above, pattern signal amplitude time series curve 811 makes an appearance in both FIGS. 8B and 8C, having pattern signal amplitudes written at a write backoff of 29 milliwatts and a laser pre-bias current of 16 milliamps. As illustratively depicted in FIG. 8C, the higher the value of laser pre-bias current at the same write backoff, the higher the pattern signal amplitude—consistent with the write element being more thermally expanded, without compensation by a varying write backoff, and thus having a lower fly height, closer to the disk surface during the short pattern write operation, and thus leaving a stronger pattern in the disk surface that renders higher pattern signal amplitudes during the read operation. FIG. 8C also shows that the relative rate of increase in pattern signal amplitude varies over time but is not very divergent from being at least relatively linearly proportional during certain intervals such as the same interval indicated above of 30 to 50 nanoseconds, for example.

FIG. 8C also shows that the increase in pattern signal amplitude at a laser pre-bias current of 8 mA is barely any higher than for the baseline of zero laser pre-bias through much of the 100 nanosecond range, and even dips below it momentarily (at 88 and 96 nanoseconds), indicating that what difference there is indicated may not be significantly above noise in the data. On the other hand, FIG. 8C shows a clearly faster increase in pattern signal amplitude across the subsequent 8 mA, i.e., going from 8 to 16 mA, demonstrating that the increase in fly height and thus pattern signal amplitude is not linearly proportional to laser pre-bias current. This is due to the effect of the laser threshold. The very slight difference between time series curves 814 and 816, if even real and not largely or wholly an artifact of noise in the data, are suggestive that the laser pre-bias current of 8 mA may be either barely above, or insufficient to reach, the laser threshold of laser unit 320 of this particular individual head 300.

Laser unit 320 requires a certain minimum threshold current as its threshold to begin emitting the laser. Given the complexity and limits of precision mass nanoscale manufacturing of laser unit 320, and the surrounding features of head 300 and disk drive 15 that may affect the operation of laser unit 320, it may be infeasible to produce head 300 with a precisely pre-determined laser threshold for laser unit 320. The laser threshold of disk drive head laser units on the scales has also been challenging to feasibly determine in the prior art. Yet, an accurate value of the minimum threshold current of the laser threshold is a valuable and important system property to have.

The present disclosure comprises novel and advantageous methods, systems, and devices for accurately determining the laser threshold of head laser unit 320. Determining the laser threshold in illustrative examples according to the principles of this disclosure is further discussed below.

Figure 9:
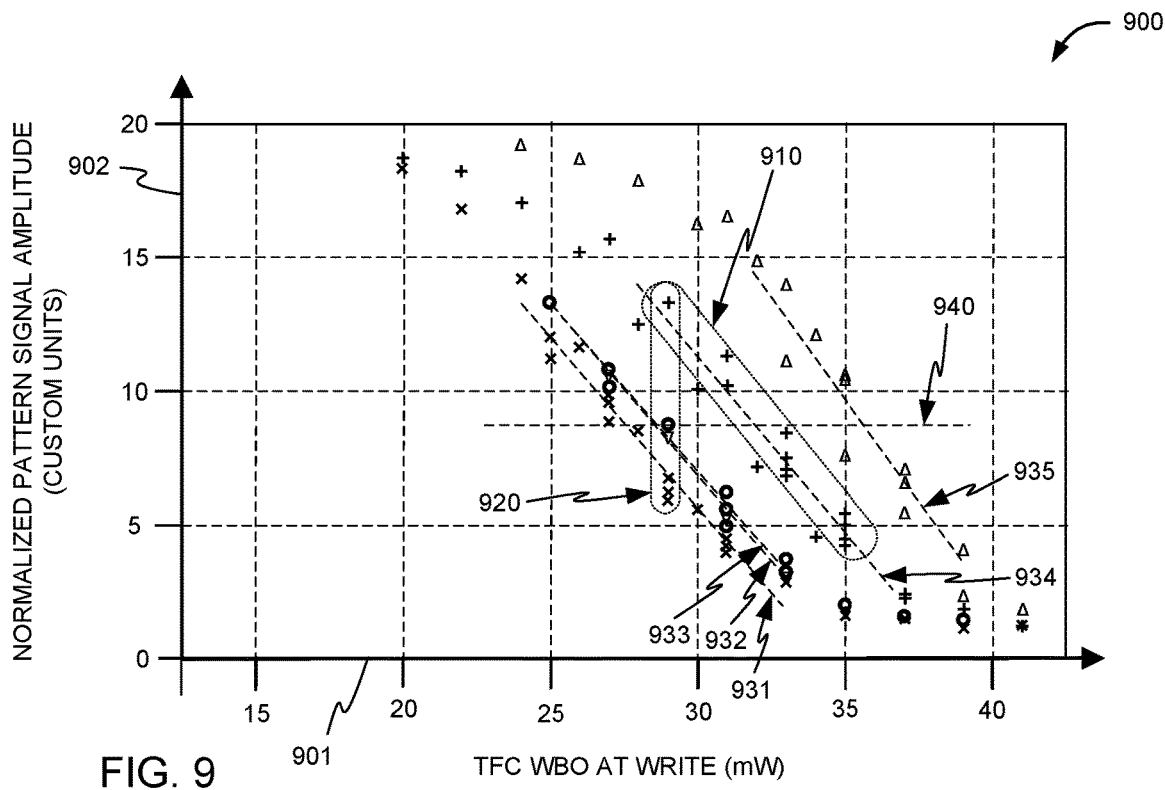
FIG. 9 depicts a graph of pattern signal amplitudes over TFC write backoff at the respective write operations for the pattern signal amplitude data points from the matrix of FIG. 8A, in accordance with the same illustrative example of this disclosure as in FIGS. 8A-8C.

FIG. 9 depicts a graph 900 of pattern signal amplitudes on y axis 902 over TFC write backoff at the respective write operations on x axis 901 for the 120 pattern signal amplitude data points from matrix 800 drawn from within the 30 to 50 nanosecond range, or more precisely, those at the 32, 40, and 48 nanosecond marks, from each of the 40 combinations of laser pre-bias current and write backoff collected in the process resulting in the data of matrix 800, in accordance with the same illustrative example of this disclosure as in FIGS. 8A-8C. Thus, in graph 900, pattern signal amplitude data points at constant values of write backoff are depicted along vertical lines, such as example vertical line 920, which shows all the pattern signal amplitudes recorded at a write backoff of 29 milliwatts, a subset of which are taken from pattern signal amplitude time series 811, 814, and 816 of FIG. 8C; while pattern signal amplitude data points at constant values of laser pre-bias current form generally sigmoid curves between the lower right and the upper left, that is, between the region of high write backoff and low pattern signal amplitude generally in the lower right portion of graph 900, and the region of low write backoff and high pattern signal amplitude generally in the upper left portion of graph 900.

In some aspects, graph 900 shows that in the intermediate range of pattern signal amplitude, the constant laser pre-bias curve sections 931, 932, 933, 934, and 935 that would be formed by connecting data points of each value of constant laser pre-bias current at different values of write back form approximately straight, diagonal lines that are parallel or substantially parallel to each other. In the example shown, the normalized pattern signal amplitude is shown on y axis 902, while the TFC WBO is shown on x axis 901. Further, in this example, the intermediate range of pattern signal amplitudes (between about 5 and 13 in the custom units of this graph and centered on 9 amplitude units) generally correspond to the intermediate values of the laser pre-bias current used. Here, the constant laser pre-bias curve sections 931, 932, 933, 934, 935 of the sigmoid curves of constant laser pre-bias are formed by connecting all data points of different values of laser pre-bias current (e.g., 0, 8, 12, 16, 20 milliamps) at different values of write backoff, where the data points of each laser pre-bias current are shown with a different symbol (e.g., an 'x', inverted triangle, circle, plus sign, and right-side up triangle). This is indicative of an at least approximately linear relationship in this region between write backoff and pattern signal amplitude. These approximately linear constant laser pre-bias curve sections may be formed by curve-fitting to the groups of data points of constant laser pre-bias current, such as approximately linear set of data points 910 comprising the pattern signal amplitudes recorded at a laser pre-bias current of 16 milliamps, a subset of which are taken from pattern signal amplitude time series 811, 813, 815, and 817 of FIG. 8B. Further, these diagonal, linear, constant laser pre-bias curve sections are: (1) closely bunched together for the lower values of laser pre-bias current, and (2) approximately evenly spaced apart for the higher values. Shown here are lower values of 0, 8, or 12 milliamps for constant laser pre-bias curve sections 931, 932, and 933, respectively and higher values of 12, 16, or 20 milliamps for curve sections 933, 934, and 935, respectively. This is indicative of an at least approximately linear relationship between laser pre-bias current and write backoff in the region of higher laser pre-bias current (e.g., of 12, 16, or 20 milliamps, in this example), distinct from the flat relationship between laser pre-bias current and write backoff in the region of lower laser pre-bias current (e.g., of 0, 8, or 12 milliamps, in this example).

The data in this region of linear relationship between write backoff and pattern signal amplitude may be used to fit a closest-fit line through the range for each value of laser pre-bias current. Because the relationship is linear throughout about the range of 5 to 13 custom units in pattern signal amplitude, any particular pattern signal amplitude within this range may be selected as an amplitude comparison line, along which to select the data that demonstrate the linear relationship. The approximate center of this region may have an advantage in accuracy of this relationship, so an amplitude comparison line 940 at approximately 9 pattern amplitude units may illustratively be used to compare the relationship between laser pre-bias current and write backoff, as further explained below with reference to FIG. 10.

The approximately linear region of the pattern signal data overlaps the write backoff values in a more complex arrangement, largely overlapping the intermediate values of write backoff, and intersecting the lowest values of write backoff only for the lowest values of laser pre-bias current, and intersecting the highest values of write backoff only for the highest values of laser pre-bias currents—in other words, where the laser pre-bias current and the write backoff were closer to a compensatory balance. These relationships between laser pre-bias current, write backoff, and pattern signal amplitude may be used to generate the graphical and analytical conclusions depicted in FIG. 10 and described with reference thereto.

Figure 10:
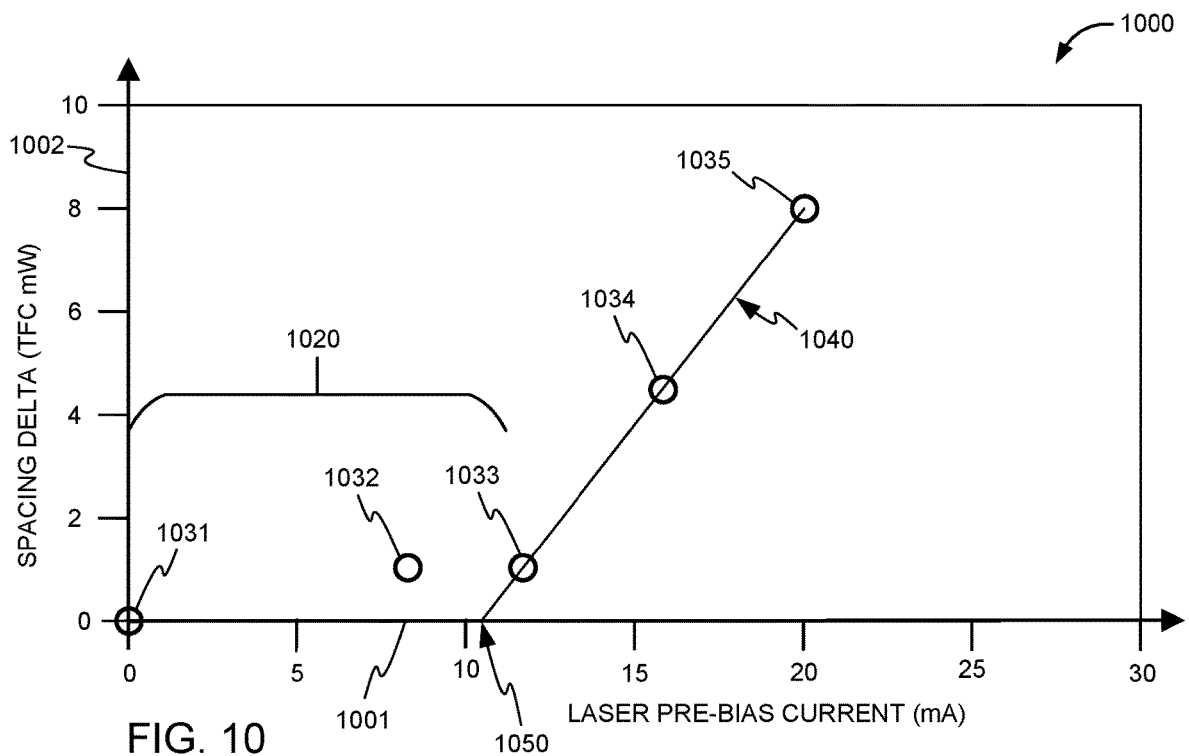
FIG. 10 depicts a graph of spacing delta due to partial thermal protrusion, i.e., the TFC and Pre-bias spacing Parity (TPP) or rate of change of fly height to be compensated for by write backoff, relative to laser pre-bias current, in accordance with illustrative aspects of the present disclosure.

FIG. 10 depicts a graph 1000 of spacing delta due to partial thermal protrusion, i.e., the TFC and Pre-bias spacing Parity (TPP) or rate of change of fly height to be compensated for by write backoff, relative to laser pre-bias current, in accordance with illustrative aspects of the present disclosure. Graph 1000 may be thought of as a distillation of the pattern signal amplitude matrix information in graph 900 of FIG. 9, toward determining the TPP relation and the laser threshold based on the pattern signal amplitude matrix information. Graph 1000 also shows the laser current threshold 1050, at approximately 11 milliamps, in this illustrative example. The spacing delta due to partial thermal protrusion is given on the y axis 1002, in units of mW of TFC WBO power (with TFC WBO power proportional and equivalent to displacement due to thermal protrusion), and the laser pre-bias current is presented on the x axis 1001 in units of mA. The five data points shown, 1031, 1032, 1033, 1034, and 1035, are taken from the intersections of the constant laser pre-bias curve sections 931, 932, 933, 934, 935 of FIG. 9 with the amplitude comparison line 940 of FIG. 9. Data point 1031 is taken from the intersection of laser pre-bias current curve 931 with laser pre-bias current of 0 with amplitude comparison line 940 in FIG. 9, and its value of TFC WBO, 28 mW, is taken as the zero baseline for graph 1000, so data point 1031 is set as the origin for graph 1000, and its value of write backoff, 28 mW, is set as the zero point for TFC WBO spacing delta. In other words, TFC WBO spacing delta may be measured as the additional TFC WBO required to compensate for laser pre-bias current above the zero baseline WBO of 28 mW at the amplitude comparison line of a pattern signal amplitude of 9 custom units, in this illustrative example.

As graph 1000 shows, data points 1032 and 1033 are taken from the intersections of laser pre-bias current curves 932 and 933, with laser pre-bias current of 8 and 12 milliamps, respectively, with amplitude comparison line 940, and both of which are at a TFC WBO of approximately 29 mW, or 1 mW above the WBO zero baseline in graph 1000. Data point 1034 is taken from the intersection of laser pre-bias current curve 934, with laser pre-bias current of 16 mA, with amplitude comparison line 940, at a TFC WBO of approximately 32.5 milliwatts, or 4.5 milliwatts above the WBO zero baseline; and data point 1035 is taken from the intersection of laser pre-bias current curve 935, with laser pre-bias current of 20 mA, with amplitude comparison line 940, at a TFC WBO of approximately 36 milliwatts, or 8 milliwatts above the WBO zero baseline. Thus, graph 1000 shows that the laser current threshold for the laser unit 320 of this particular head 300 is close to the 12 mA value of laser pre-bias current, such that the WBO spacing delta values at 8 and 12 mA of laser pre-bias current are barely above the WBO zero baseline. Additionally, the WBO spacing delta values at 12, 16, and 20 mA of laser pre-bias current show a linear, or at least substantially linear, and proportional relationship to the WBO spacing. For instance, TPP trend line 1040, which corresponds to a linear increase portion, in graph 1000 depicts an increase of about 3.5 milliwatts of WBO for each rise of 4 milliamps of laser pre-bias current. Graph 1000 thus forms a "hockey stick" profile, with an approximately flat left half before the laser threshold, and a linear, constant slope rise on the right half, indicative of a directly proportional TPP relation. Control circuitry 22 may thus be configured to determine a slope of an increase in a spacing delta due to thermal protrusion of the write element, as may be measured in terms of compensatory write backoff, in relation to the laser pre-bias current. In some cases, the control circuitry 22 may determine the TPP relation based at least in part on this slope of increase in the spacing delta due to thermal protrusion of the write element, in various examples.

The slope of TPP trend line 1040 may thus provide the TPP relation, within the valid range for TPP, above the laser current threshold and within the analyzed, linear ranges of laser pre-bias current and write backoff, illustratively in units of write backoff power per laser pre-bias current. In this illustrative example, the slope of TPP trend line 1040 may be estimated as:

$$\text{TPP} \sim (8-1)/(20-12) \sim 0.88 \text{ mW/mA} \quad \text{(Equation 1)}$$

(rounded up from 0.875 to avoid false precision in the significant figures based on the precision level of the input data in this illustrative example). In some examples, control circuitry 22 may also determine the laser threshold based on determining a value of the laser pre-bias current above which the spacing delta (e.g., due to thermal protrusion of the write element) begins to increase in an approximately linear fashion to the laser pre-bias current. In some cases, the laser threshold may be determined based on the intercept of the substantially linear increase portion 1040 and the substantially flat portion 1020 (which may be approximated by x axis 1001) corresponding to the relation of write backoff to laser pre-bias current for the head. In some non-limiting examples, the substantially linear increase portion 1040 may be based at least in part on a first selection of values of laser pre-bias current and write backoff that exhibit a substantially linear increase of write backoff to laser pre-bias current. Further, the substantially flat portion 1020 may be based at least in part on a second selection of values of laser pre-bias current and write backoff that exhibit a substantially flat relation of write backoff to laser pre-bias current. The substantially linear nature of the increase of write backoff to laser pre-bias current is clearly apparent in TPP trend line 1040 of FIG. 10, and clearly in contrast to the flat region 1020 of graph 1000. Such a clear contrast delineating a substantially linear increase of write backoff to laser pre-bias current above the laser threshold is generalizable to various examples, inherently due to the distinct difference in conditions between a laser unit in a pre-lasing condition and a laser unit emitting a laser. The relation of write backoff to laser pre-bias current above the laser threshold may thus be interpreted and understood by persons skilled in the relevant fields of art as a substantially linear increase in light of this understanding. In the example shown in FIG. 10, the laser threshold may be derived from the x-intercept 1050 of the TPP trend line 1040, or approximately 11 mA (or 12−0.88=11.12 mA). In some cases, the term "laser threshold" may be used to refer to the level of laser pre-bias current at which the laser unit achieves laser emission. It should be noted that, a laser pre-bias current (e.g., around 8 mA) below the laser threshold may also induce a minor increase in WBO, e.g., as a result of minor thermal expansion due to additional thermal energy added to laser unit 320, even though no laser emission is produced. Thus, aspects of the present disclosure enable the control circuitry 22 to determine the laser threshold of the laser unit, based at least in part on the pattern signal amplitudes of the write start patterns.

Control circuitry 22 of disk drive 15 may thus incorporate the information of the values for this laser threshold and this TPP relation in all or any of its subsequent operations with this particular head 300, in various examples. Control circuitry 22 may perform operations as described herein for each individual head in disk drive 15, and thus determine and store information for the TPP relation and laser threshold for each individual head 300. In some cases, the determined relation to write backoff to laser pre-bias current for the head, such as the TPP relation described above, may be used to calibrate operation of the fly height control element above the corresponding disk surface for short write operations.

In various illustrative examples, control circuitry 22 may use the information on TPP relation and laser threshold for each individual head 300 to perform self-servo write operations based on very short write operations, or pre-biased burst write scheme (Pre-biased BWS) operations. In such cases, the fly height may be calibrated for each head 300 based on TPP relations and laser thresholds for each individual head 300, where the fly height may be calibrated prior to performing any longer, normal write operations (e.g., as typically required for BWS operations). In some examples, principles of this disclosure may be used to replace prior art methods of applying a fixed, blanket fly height that had to be set without the kind of accurate characterizations of head properties and behavior as provided and enabled herein, and which therefore had to be more conservative in setting fly height than would be necessary with the capabilities provided in this disclosure. Principles, methods, systems, and devices of examples of this disclosure may thus enable closer fly heights and higher data areal density while maintaining safety, reliability, and long lifetime. Control circuitry 22 may thus use this information on TPP relation and laser threshold for each individual head 300 to accurately and safely perform novel and advantageous levels of nanoscale self-servo write processes and expand the technological frontiers of data areal density and reliability of data storage technology, in illustrative aspects of this disclosure.

In various aspects, therefore, one or more processing devices (e.g., control circuitry 22 of disk drive 15) may be configured to iteratively perform write start operations of write start patterns with one or more heads on corresponding one or more disk surfaces of disks at a plurality of values of laser pre-bias current applied to the laser unit, a plurality of values of write backoff applied to the fly height control element, and/or at, at least one of laser pre-bias current applied to the laser unit. Control circuitry 22 may be configured to iteratively perform write start operations of write start patterns with the one or more heads at a plurality of values of laser pre-bias current applied to the laser unit, and/or at a plurality of values of write backoff applied to the fly height control element, such as by performing write start operations of write start patterns at each of a selected plurality of values of write backoff and/or at each of a selected plurality of values of laser pre-bias current, holding a first of these two variables constant while sweeping through various values of the second, and then iterating through additional values of the first, thereby creating write start patterns with a matrix of values of both write backoff and laser pre-bias current, or at least a vector of a plurality of values of one while holding the other constant, as described herein. The one or more processing devices may be configured to detect pattern signal amplitudes of the write start patterns on a respective corresponding disk surface, as described herein. The one or more processing devices may be configured to determine a relation of write backoff to laser pre-bias current for the head, based at least in part on the pattern signal amplitudes of the write start patterns, such as determining the TPP relation, as described herein.

In some examples, control circuitry 22 may perform operations analogous to those described above but using lower or higher numbers of laser pre-bias current, write backoff, sampling time interval, and sampling time range, and thus use lower or higher amounts of data to perform determinations of TPP relation and laser threshold. In some examples, operations as described above may be performed for one head or a limited number of heads, and then those results, including TPP relations and laser thresholds, may be applied to other disk drives. For example, control circuitry 22 of one disk drive 15 or a limited number of disk drives 15 may perform operations as described above, and may reveal that TPP relations and laser thresholds are highly uniform and precise across disk drives of a product line or manufacturing batch, so that the results from those operations may be programmed into or loaded onto additional disk drives, without performing further custom operations by each disk drive or for each head to determine TPP relations and laser thresholds. In some of these examples, control circuitry 22 of various disk drives may instead perform a validation or quality assurance process to validate the values for TPP relation and laser threshold as programmed in or loaded onto the respective disk drives. In various examples, one or more processing devices, which may or may not necessarily comprise or be comprised in control circuitry 22 as described herein, may perform, execute, or implement any of various aspects of the operations and principles of this disclosure in further applications.

In some examples, control circuitry 22 may use fewer numbers of values of laser pre-bias current and write backoff, down to as little as one single value of either laser pre-bias current or write backoff. In some instances, two or more values may be needed to determine the slope. In other cases, one point (or value) may suffice, for instance, when a laser threshold is assumed. That is, in some examples, there may be good enough modeling or analysis such that a single value of laser pre-bias current is predetermined, which may be determined ahead of time to be above the laser threshold, and control circuitry 22 may be configured to write and then read and use pattern signal amplitudes with varying values of write backoff, including as few as two values of write backoff, with only a single value of laser pre-bias current, to determine a TPP relation. In some examples, there may be good enough modeling or analysis such that a single value of write backoff is predetermined, and control circuitry 22 may be configured to write and then read and use pattern signal amplitudes with varying values of laser pre-bias current, including as few as only two values of laser pre-bias current, or including at least two values of laser pre-bias current that are above the laser threshold, with only a single value of write backoff, to determine a TPP relation.

In some examples, control circuitry 22 may be configured to implement an auxiliary safeguard against potential head-disc contact for a subset of the write start operations performed under conditions of write backoff and laser pre-bias current in which the fly height may be on a lower end of a nominal range. Control circuitry 22 may be configured to implement an auxiliary safeguard against potential head-disk contact for a subset of the write start operations performed at least one of: values of write backoff at a lower end of a range of the values of write backoff, and values of laser pre-bias current at a higher end of a range of the values of laser pre-bias current, both of which conditions may involve the fly height being lower than in other conditions. Control circuitry 22 may be configured to implement an auxiliary safeguard against potential head-disk contact especially during write start operations performed under a combination of low values of write backoff and high values of laser pre-bias current, where that combination may drive fly height to its lowest levels of any combination of values in a matrix of values as discussed herein (where low and high values are relative to the types of ranges of values discussed herein in some examples, and may be relative to any other nominal range developed in an engineering process in accordance with the principles of this disclosure, in various examples). In some examples, low values of write backoff and high values of laser pre-bias current may at least include the lowest and highest values, respectively, that are included in a matrix of combinations of values used in write start operations, and/or may include any relative number of relatively lower and higher values, respectively, in selected ranges.

As one illustrative example, control circuitry 22 may implement an auxiliary safeguard against potential head-disk contact in the form of detecting fly height during write start operations and performing post-processing on the fly height signal during the write start operations with an operation abort or modification trigger condition that is activated if the fly height is detected to be below a nominal safety margin, with a rapid response to increase the write backoff value during that particular write start operation, or to abort that particular write start operation, to safeguard against potential head-disk contact. As part of this auxiliary safeguard process, the modified or aborted write start operation may be logged, and optionally, taken into account in subsequent analysis, in various examples. For instance, in some cases, the modified value of write backoff recorded by the modified write start operation may be utilized in a subsequent analysis. In some other cases, the control circuitry 22 may disregard the write start pattern recorded by the aborted write start operation. Auxiliary safeguards that control circuitry 22 may implement against potential head-disk contact may also take any other form developed under an engineering process in accordance with principles of this disclosure that may tend to prevent or protect against potential head-disk contact, in various examples.

In some examples, systems, devices, and methods of this disclosure may also enable novel and advantageous techniques and processes for spiral write operations. For example, control circuitry 22 may also write various early spirals with a matrix of various values of both laser pre-bias current and write backoff and perform analogous operations as those described above to determine TPP relations specifically derived from the operating conditions of writing spirals and thus specifically optimized for spiral write operations. In various examples, control circuitry 22 may perform these spiral write operations at one or more values of start disk phase, based at least in part on a spindle locked clock disk phase. At least some spiral writes, including the first bootstrap spiral writes, in various examples, may also be relatively short, and may not invoke full write head thermal protrusion as in normal write operations, but may invoke greater partial thermal protrusion of the write heads than due only to pre-lasing or laser pre-biasing. Control circuitry may thus perform spiral write operations with a matrix of various values of both laser pre-bias current and write backoff, and perform analogous operations as those described above to determine TPP relations for pre-lasing, but specifically derived from the operating conditions of writing spirals, potentially including relatively greater but still partial thermal protrusion of the write heads, and thus determine a separate, custom TPP relation specific to spiral write operations. Control circuitry 22 may thus specifically optimize a TPP relation and a calibration setting based thereon for spiral write operations Control circuitry 22 may then calibrate fly height of the heads with the spiral specific TPP relations for writing subsequent spirals.

As part of the beginning of this process in various examples, control circuitry 22 may control the actuator assembly to begin at a known position, such as by resting against an ID crash stop ("IDCS") and use that position as a starting position reference before writing the spirals. Using the IDCS as a starting reference may be used instead of servo patterns for writing spirals, in some examples.

Thus, control circuitry 22 may iteratively perform spiral write operations of spiral patterns with the head on the corresponding disk surface, at a plurality of values of laser pre-bias current applied to the laser unit, at a plurality of values of write backoff applied to the fly height control element, and at one or more values of start disk phase, based at least in part on a spindle locked clock disk phase, in various examples. Control circuitry 22 may detect pattern signal amplitudes of the spiral patterns on the corresponding disk surface and determine a relation of write backoff to laser pre-bias current for the head applicable to the spiral patterns, based at least in part on the pattern signal amplitudes of the spiral patterns, in various examples. Control circuitry 22 may thus use principles and methods in various examples of this disclosure to accomplish the process of writing spirals and concentrics more quickly, efficiently, and/or accurately than in the typical prior art, which may also help enable further gains in data areal density optimized with reliability and other novel advantages, in various examples.

In some examples, systems, devices, and methods of this disclosure may also include corrections for secondary effects or corner cases, such as non-linear laser mode hopping, and long-term fly height change (LTFH), and potentially to implement additional safeguards, if needed, against head-disk contact at lower values of write TFC backoff and higher values of laser pre-bias current (both of which may reduce fly height). In various examples, control circuitry 22 may screen for and/or compensate for possible small shifts in amplitude due to laser mode hopping, via ensuring accuracy in measurement and data processing, and incorporating dedicated means for detecting and compensating for laser mode hopping. In various examples, long-term fly height change may be altered by laser pre-bias, so novel uses of laser pre-bias in examples of this disclosure may make previously unexpected changes in long-term fly height change. In many examples of this disclosure, any long-term fly height change is negligible for purposes of implementing methods, systems, and devices of this disclosure. However, various examples may still include means dedicated for detecting and compensating for any non-negligible long-term fly height change. In one illustrative example, the long-term fly height change of the head is approximately 10 picometers divided by the laser pre-bias current in milliamps (times a conversion constant). Any needed corresponding calibration correction in fly height may be implemented based on a known, non-negligible long-term fly height change relation such as this. Control circuitry 22 may thus be configured to compensate for one or more of non-linear laser mode hopping and long-term fly height change, as described herein, in various examples. In some non-limiting examples, the control circuitry 22 may obtain mean values of results taken from multiple locations, which may facilitate in laser mode hopping containment.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub combinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for accurately determining TPP relations and laser thresholds for disk drive heads, and other aspects of this disclosure. Persons skilled in the relevant fields of art will be well-equipped by this disclosure with an understanding and an informed reduction to practice of a wide panoply of further applications, architectures, techniques, and methods for determining TPP relations and laser thresholds for disk drive heads, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator assembly comprising a head, and configured to position the head over a corresponding disk surface of the one or more disks; and
   one or more processing devices,
   wherein the head comprises:
      a write element;
      a laser unit; and
      a fly height control element,
   and wherein the one or more processing devices are configured to:
      iteratively perform write start operations of write start patterns with the head on the corresponding disk surface, at a plurality of values of at least one of laser pre-bias current applied to the laser unit, and write backoff applied to the fly height control element;
      detect pattern signal amplitudes of the write start patterns on the corresponding disk surface; and
      determine a relation of write backoff to laser pre-bias current for the head, based at least in part on the pattern signal amplitudes of the write start patterns.

2. The data storage device of claim 1, wherein the one or more processing devices are further configured to iteratively perform the write start operations of the write start patterns at a plurality of values of laser pre-bias current applied to the laser unit, and at a plurality of values of write backoff applied to the fly height control element.

3. The data storage device of claim 1, wherein the one or more processing devices are further configured to:
   select a portion of the pattern signal amplitudes that exhibit a substantially linear increase of write backoff to laser pre-bias current; and
   determine the relation of write backoff to laser pre-bias current for the head based at least in part on the selected portion of the pattern signal amplitudes that exhibit the substantially linear increase of write backoff to laser pre-bias current.

4. The data storage device of claim 1, wherein determining the relation of write backoff to laser pre-bias current for the head comprises determining a slope of an increase in a spacing delta due to thermal protrusion of the write element in relation to the laser pre-bias current.

5. The data storage device of claim 1, wherein the one or more processing devices are further configured to calibrate operation of the fly height control element for short write operations, using the determined relation of write backoff to laser pre-bias current for the head.

6. The data storage device of claim 1, wherein the one or more processing devices are further configured to determine the relation of write backoff to laser pre-bias current for the head within a range of the values of the laser pre-bias current that are above a laser threshold of the laser unit.

7. The data storage device of claim 1, wherein the one or more processing devices are further configured to determine a laser threshold of the laser unit, based at least in part on the pattern signal amplitudes of the write start patterns.

8. The data storage device of claim 7, wherein determining the laser threshold comprises determining a value of the laser pre-bias current above which a spacing delta due to thermal protrusion of the write element increases approximately linearly in relation to the laser pre-bias current.

9. The data storage device of claim 7, wherein the one or more processing devices are further configured to:
   determine the laser threshold of the laser unit based on an intercept of a substantially linear increase portion of the relation of write backoff to laser pre-bias current for the head, and a substantially flat portion of the relation of write backoff to laser pre-bias current for the head,
   wherein the substantially linear increase portion of the relation is based at least in part on a first selection of values of laser pre-bias current and write backoff that exhibit a substantially linear increase of write backoff to laser pre-bias current, and
   wherein the substantially flat portion of the relation of write backoff to laser pre-bias current for the head is based at least in part on a second selection of values of laser pre-bias current and write backoff that exhibit a substantially flat relation of write backoff to laser pre-bias current.

10. The data storage device of claim 1, wherein the write start operations of the write start patterns comprise short write start operations of short write start patterns, wherein the short write start operations are of a short enough duration that a thermal protrusion of the head does not reach a full level of thermal protrusion that occurs during normal write operations with the head.

11. The data storage device of claim 1, wherein the write start operations of the write start patterns comprise burst write scheme start operations of burst write scheme start patterns.

12. The data storage device of claim 1, wherein the one or more processing devices are further configured to activate the laser pre-bias current, thereby inducing a steady-state partial thermal protrusion of the head, prior to iteratively performing the write start operations.

13. The data storage device of claim 1, wherein the one or more processing devices are further configured to:
iteratively perform spiral write operations of spiral patterns with the head on the corresponding disk surface, at least one of a plurality of values of laser pre-bias current applied to the laser unit, a plurality of values of write backoff applied to the fly height control element, and one or more values of start disk phase, based at least in part on a spindle locked clock disk phase;
detect pattern signal amplitudes of the spiral patterns on the corresponding disk surface; and
determine a relation of write backoff to laser pre-bias current for the head applicable to the spiral patterns, based at least in part on the pattern signal amplitudes of the spiral patterns.

14. The data storage device of claim 1, wherein the one or more processing devices are further configured to compensate for one or more of non-linear laser mode hopping and long-term fly height change.

15. The data storage device of claim 1, wherein the one or more processing devices are further configured to implement an auxiliary safeguard against potential head-disc contact for at least a subset of the write start operations performed at least one of: values of write backoff at a lower end of a range of the values of write backoff, and values of laser pre-bias current at a higher end of a range of the values of laser pre-bias current.

16. A method comprising:
iteratively performing, by one or more processing devices, write start operations of write start patterns with a head of a data storage device on a corresponding disk surface of the data storage device, at a plurality of values of at least one of laser pre-bias current applied to a laser unit of the head, and write backoff applied to a fly height control element of the head;
detecting, by the one or more processing devices, pattern signal amplitudes of the write start patterns on the corresponding disk surface; and
determining, by the one or more processing devices, a relation of write backoff to laser pre-bias current for the head, based at least in part on the pattern signal amplitudes of the write start patterns.

17. The method of claim 16, further comprising:
selecting a portion of the pattern signal amplitudes that exhibit a substantially linear increase of write backoff to laser pre-bias current;
determining a slope of an increase in a spacing delta due to thermal protrusion of the write element in relation to the laser pre-bias current, based on the portion of the pattern signal amplitudes that exhibit the substantially linear increase of write backoff to laser pre-bias current; and
determining the relation of write backoff to laser pre-bias current for the head based at least in part on the slope of the increase in the spacing delta due to thermal protrusion of the write element in relation to the laser pre-bias current.

18. The method of claim 16, further comprising calibrating operation of the fly height control element for short write operations, using the determined relation of write backoff to laser pre-bias current for the head.

19. One or more processing devices comprising:
means for iteratively performing write start operations of write start patterns with a head of a data storage device on a corresponding disk surface of the data storage device, at a plurality of values of at least one of laser pre-bias current applied to a laser unit of the head, and write backoff applied to a fly height control element of the head;
means for detecting pattern signal amplitudes of the write start patterns on the corresponding disk surface; and
means for determining a relation of write backoff to laser pre-bias current for the head, based at least in part on the pattern signal amplitudes of the write start patterns.

20. The one or more processing devices of claim 19, further comprising:
means for selecting a portion of the pattern signal amplitudes that exhibit a substantially linear increase of write backoff to laser pre-bias current;
means for determining a slope of an increase in a spacing delta due to thermal protrusion of the write element in relation to the laser pre-bias current, based on the portion of the pattern signal amplitudes that exhibit the substantially linear increase of write backoff to laser pre-bias current; and
means for determining the relation of write backoff to laser pre-bias current for the head based at least in part on the slope of the increase in the spacing delta due to thermal protrusion of the write element in relation to the laser pre-bias current.

* * * * *